US010592187B2

(12) United States Patent
Marcos et al.

(10) Patent No.: US 10,592,187 B2
(45) Date of Patent: Mar. 17, 2020

(54) ACCESSORY DEVICE OPERATION WITH USER MOBILE DEVICE OVER NETWORK CONNECTION

(71) Applicant: Apple Inc., Cupertino, CA (US)

(72) Inventors: Paul D. Marcos, Los Altos, CA (US); Andrew E. Platzer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 698 days.

(21) Appl. No.: 14/837,336

(22) Filed: Aug. 27, 2015

(65) Prior Publication Data

US 2016/0062721 A1 Mar. 3, 2016

Related U.S. Application Data

(60) Provisional application No. 62/044,797, filed on Sep. 2, 2014.

(51) Int. Cl.
*G06F 3/14* (2006.01)
*G06F 1/16* (2006.01)
(Continued)

(52) U.S. Cl.
CPC ............ *G06F 3/1423* (2013.01); *G06F 1/163* (2013.01); *G06F 9/452* (2018.02); *G09G 5/006* (2013.01); *G09G 5/12* (2013.01); *G09G 2370/16* (2013.01)

(58) Field of Classification Search
None
See application file for complete search history.

(56) References Cited

U.S. PATENT DOCUMENTS 7,130,664 B1 10/2006 Williams
8,787,006 B2 7/2014 Golko
(Continued)

FOREIGN PATENT DOCUMENTS

CN 103797472 5/2014
CN 104007820 8/2014
(Continued)

OTHER PUBLICATIONS

International Search Report and Written Opinion dated Nov. 18, 2015, for International Application No. PCT/US2015/047513, 12 pages.

(Continued)

*Primary Examiner* — David D Davis
(74) *Attorney, Agent, or Firm* — Kilpatrick Townsend & Stockton LLP

(57) ABSTRACT

An accessory device application executes on an accessory device of limited resources. The accessory device application includes an accessory device stub application and an interface definition. When a user interacts with the accessory device application, display changes are generated in response, in accordance with the interface definition, and are sent to a companion extension at an associated companion device. The companion extension receives the changes, and generates updated display values for the accessory device display. The updated display values are sent from the companion device daemon to the daemon of the accessory device, which displays the updated display values at the accessory device display. The functionality and operation of the accessory device application permit an accessory device of limited resources to leverage data processing and computational power of the companion device, to provide a more involving user experience at the accessory device.

36 Claims, 17 Drawing Sheets

(51) Int. Cl.
*G09G 5/00* (2006.01)
*G09G 5/12* (2006.01)
*G06F 9/451* (2018.01)

(56) References Cited

U.S. PATENT DOCUMENTS

| | | | |
|---|---|---|---|
| 9,182,965 B2 | 11/2015 | Khushraj | |
| 9,420,087 B2 | 8/2016 | Marcos et al. | |
| 9,967,387 B2* | 5/2018 | Marcos | H04M 1/7253 |
| 2002/0115478 A1 | 8/2002 | Fujisawa et al. | |
| 2007/0285390 A1 | 12/2007 | Yee et al. | |
| 2010/0231352 A1* | 9/2010 | Bolton | H04L 9/3234 |
| | | | 340/5.8 |
| 2010/0235550 A1 | 9/2010 | Bolton et al. | |
| 2011/0223968 A1 | 9/2011 | Bunk et al. | |
| 2011/0246891 A1 | 10/2011 | Schubert et al. | |
| 2012/0081207 A1 | 4/2012 | Toprani et al. | |
| 2013/0111463 A1* | 5/2013 | Khushraj | G06F 8/61 |
| | | | 717/174 |
| 2014/0025537 A1* | 1/2014 | Venkataramu | G06Q 30/0621 |
| | | | 705/26.61 |
| 2014/0045547 A1 | 2/2014 | Singamsetty et al. | |
| 2014/0215457 A1 | 7/2014 | Gava et al. | |
| 2014/0317303 A1 | 10/2014 | Toprani et al. | |
| 2014/0365694 A1 | 12/2014 | Bolton et al. | |
| 2015/0178236 A1* | 6/2015 | Sharma | G06F 13/385 |
| | | | 710/38 |
| 2016/0065714 A1* | 3/2016 | Marcos | H04M 1/7253 |
| | | | 455/556.1 |
| 2017/0019521 A1* | 1/2017 | Marcos | H04M 1/7253 |
| 2018/0007188 A1* | 1/2018 | Marcos | H04M 1/7253 |

FOREIGN PATENT DOCUMENTS

| | | |
|---|---|---|
| CN | 203775292 | 8/2014 |
| EP | 2230605 A1 | 9/2010 |
| JP | 2009164780 A2 | 7/2009 |
| JP | 2009164783 A2 | 7/2009 |
| JP | 2010268330 A2 | 11/2010 |

OTHER PUBLICATIONS

International Search Report and Written Opinion dated Nov. 18, 2015, for International Application No. PCT/US2015/047515, 12 pages.
International Search Report and Written Opinion dated Dec. 7, 2015, for International Application No. PCT/US2015/047519, 12 pages.
Non-Final Office Action for U.S. Appl. No. 14/837,442, dated Jan. 8, 2016, 6 pages.
Ex-Parte Quayle Action for U.S. Appl. No. 15/619,962, dated Oct. 6, 2017, 6 pages.
Notice of Allowance for U.S. Appl. No. 14/837,442 dated Apr. 22, 2016, 22 pages.
Non-Final Office Action for U.S. Appl. No. 15/212,167, dated Nov. 22, 2016, 9 pages.
U.S. Appl. No. 14/837,406, "Notice of Allowance", dated May 18, 2017, 7 pages.
U.S. Appl. No. 15/212,167, "Notice of Allowance", dated Mar. 10, 2017, 7 pages.
PCT/US2015/047513, "International Preliminary Report on Patentability", dated Mar. 16, 2017, 8 pages.
PCT/US2015/047515, "International Preliminary Report on Patentability", dated Mar. 16, 2017, 9 pages.
PCT/US2015/047519, "International Preliminary Report on Patentability", dated Mar. 16, 2017, 10 pages.
Non-Final Office Action dated Jan. 13, 2017 for U.S. Appl. No. 14/837,406, 13 pages.
Non-Final Office Action dated Nov. 22, 2016 for U.S. Appl. No. 15/212,167, 9 pages.
Notice of Allowance for U.S. Appl No. 15/619,962, dated Jan. 5, 2018, 7 pages.
Chinese Patent Application No. 201580046352.3, "Office Action", dated Feb. 3, 2019, 13 pages.

* cited by examiner

ACCESSORY DEVICE OPERATION WITH USER MOBILE DEVICE OVER NETWORK CONNECTION

CROSS REFERENCE TO RELATED APPLICATIONS

The present application claims the benefit of U.S. Provisional Application No. 62/044,797, filed Sep. 2, 2014, which is hereby incorporated by reference for all purposes.

BACKGROUND

The present disclosure relates generally to wireless electronic devices and in particular to operating an accessory device with a user mobile device.

Many wireless mobile electronic devices, such as wireless telephones, portable music players, tablet computers, and the like are carried about as almost a personal companion. It may be desirable for a user to acquire an accessory device that can operate with the mobile electronic device. An accessory device may comprise, for example, a wearable computer device. A user accessory device typically has reduced resources and computing power as compared to most mobile electronic devices. Nevertheless, with an accessory device, users would like to enjoy features associated with many mobile devices, such as installing selected applications for operation on the accessory device. Increased convenience and enjoyment by a user may be gained from installation of applications and operation of applications from the mobile device.

BRIEF SUMMARY

In accordance with disclosed embodiments, an accessory device application executes on an accessory device of limited resources. The accessory device application includes an accessory device stub application and an interface definition that are installed at the accessory device. When a user interacts with the accessory device, events and user commands are generated in response by the accessory device stub application and are provided to an accessory device daemon, in accordance with the interface definition, and are sent to a companion extension at an associated companion device. The companion extension receives the events and user commands, and generates updated display values for the accessory device display. The updated display values are sent from the companion device to the daemon of the accessory device, which displays the updated display values at the accessory device display. The functionality and operation of the accessory device application permit an accessory device of limited resources to leverage data processing and computational power of the companion device, to provide a more involving user experience at the accessory device.

Other embodiments are directed to systems, portable consumer devices, and computer readable media associated with methods described herein.

A better understanding of the nature and advantages of embodiments of the present invention may be gained with reference to the following detailed description and the accompanying drawings.

DEFINITIONS

Figure 1:
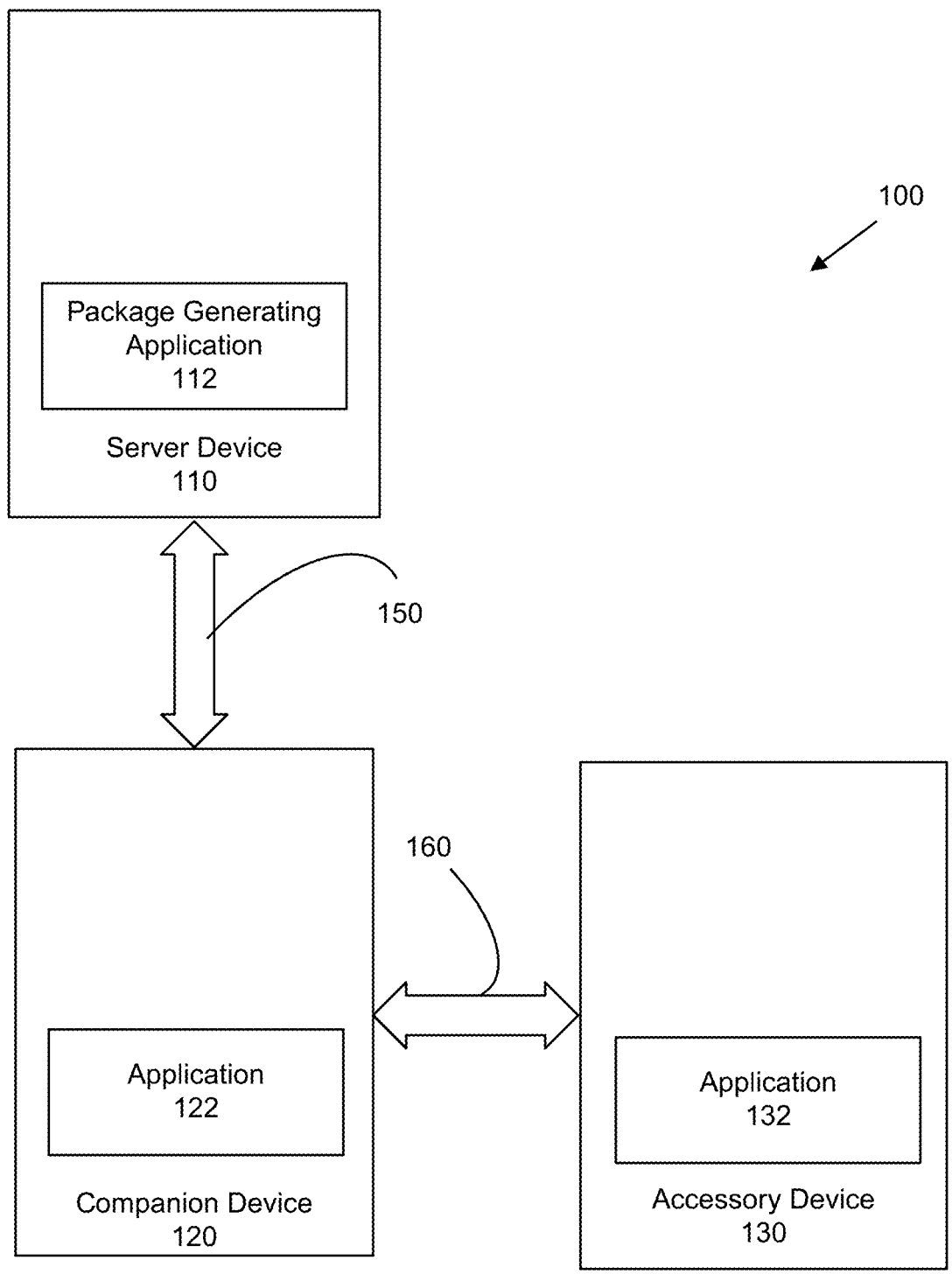
FIG. 1 is a block diagram of computer devices according to an embodiment of the invention.

As used herein, an accessory device is a class of computer device having generally limited resources and operated with a companion mobile computer device. For example, an accessory device may comprise a wearable computer device, such as a watch or health signs monitor or similar device of reduced size (e.g., any device that can be worn around a wrist, finger, neck, ear, and the like, or can be otherwise attached to a person or to the person's clothing). Such accessory computing devices have limited resources in that they have processors that are of relatively lesser capability, or have limited storage capacity, as compared with, for example, mobile computing devices such as smart telephones or tablet computers. The limited resources of an accessory computing device can result in challenging conditions for installing applications and providing useful features for a user.

DETAILED DESCRIPTION

In accordance with embodiments, applications for installation on an accessory computing device are provided as application packages that are received by an associated mobile computing device, also referred to as a companion device. The application package identifies the application for operation on the accessory device. The requested application package is received at the companion device and, pursuant to the operating system of the companion device, is installed such that the components of the application package are automatically extracted. The application package includes a companion application, a companion extension, and an accessory device application file. The accessory device application file includes an accessory device stub application and an interface definition. The application package components comprising the companion application, companion extension, accessory device stub application, and interface definition are configured to interoperate in accordance with an application package identifier that is mutually recognized among all the components and respective communication daemons that are included in the operating system (OS) of each respective device. In this way, the resources of the mobile computing device are utilized for installing the accessory computing device application and associated components.

Additional sections of this document discuss techniques in which notifications for an accessory device are received at a mobile companion device. The notifications are directed to a notification processing application of the companion device that processes notifications intended for accessory device applications. The notification processing application determines an identifier of the accessory application for which the notification is intended, and provides the identifier to a notification display application at the accessory device, which determines user interface and display properties for the notification. The accessory device requests external (dynamic) user interface and display properties from the companion device, as needed, and upon receipt generates a notification display at the accessory device.

In accordance with embodiments, an accessory device is operated in conjunction with an accessory device application whose functional processing, storing, and calculating operations are performed by the companion device. In this way, the accessory device application executes on an accessory device of limited resources. The accessory device application includes an accessory device stub application and an interface definition that are installed at the accessory device. When a user interacts with the accessory device application, events and user commands are generated in response by the accessory device stub application, in accordance with the interface definition, and are sent to the companion extension at the associated companion device. The companion extension receives the events and user commands, and generates updated display values for the accessory device display. The updated display values are sent from a daemon of the companion device to a corresponding daemon of the accessory device, which displays the updated display values at the accessory device display. Thus, communications between the companion device and the accessory device are handled by corresponding daemons on each device utilizing application names or identification codes that are mutually recognized for proper routing of communications.

I. Device Configurations

FIG. 1 is a block diagram of multiple computer devices according to an embodiment of the invention. Among the multiple devices 100 in communication with each other, a computing server device 110 communicates with a mobile computing device, also referred to as a companion device 120. The companion device 120 communicates with an accessory computing device 130 of relatively limited resources, in terms of computing power and data storage capacity. A package generating application 112 at the server device 110 can receive requests from third party developers for generating an application package intended for an accessory device, and the package generating application will generate the associated files. More particularly, a third party can provide the server device 110 with an accessory application file comprising an accessory device stub application and an interface definition, and the server device will automatically generate a companion application and a companion extension that are configured for interoperation with the accessory application file. The generated companion application and companion extension, along with the accessory device stub application and interface definition, are combined to provide an accessory device application package. That is, the package generating application 112 can comprise, for example, an application that configures mobile device applications received from developers for sale at an online application store.

Figure 3:
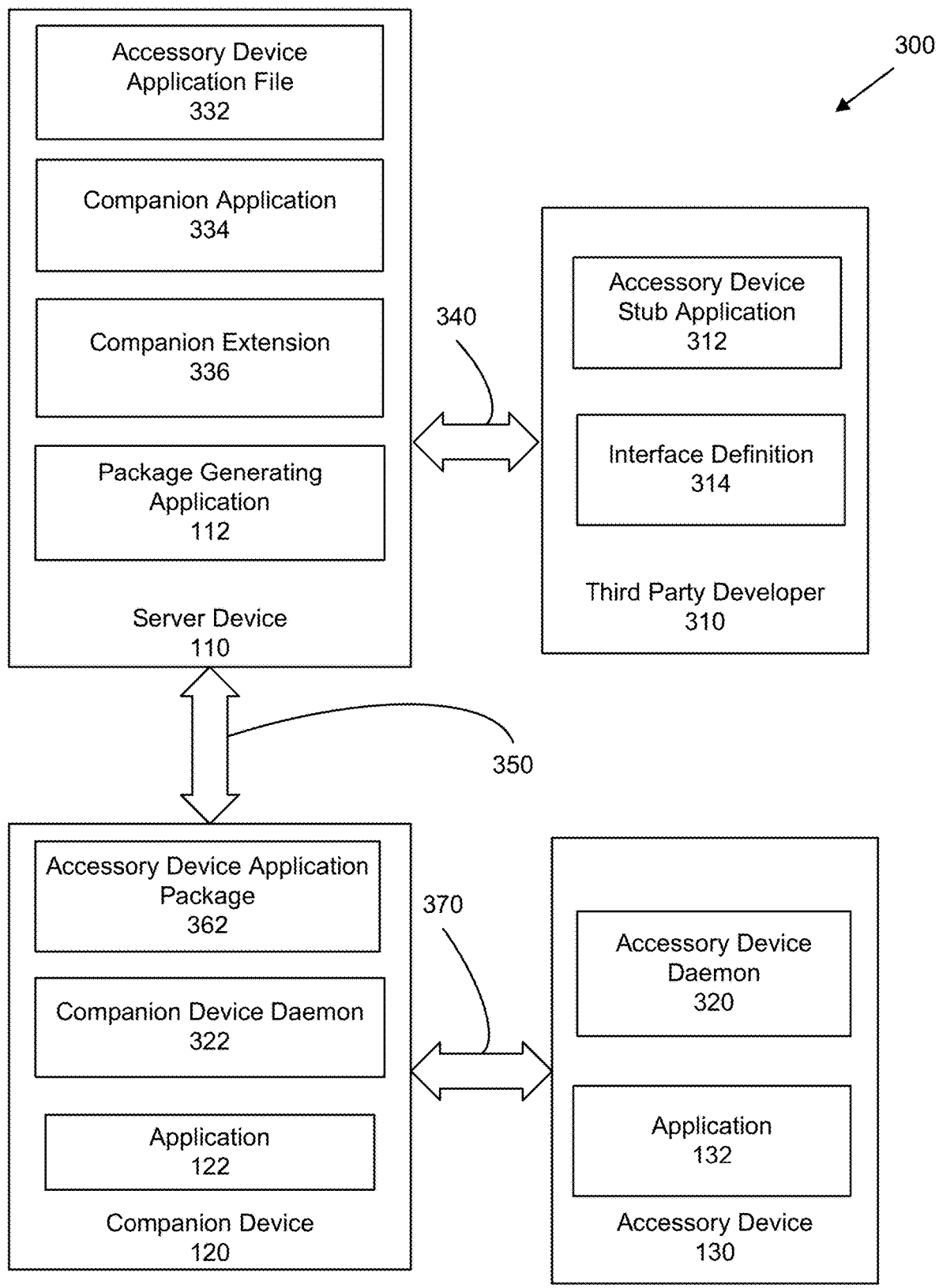
FIG. 3 is a block diagram that illustrates the devices that perform the operations illustrated in FIG. 2.

At the companion device 120, the application package for the accessory computing device 130 is received, and the package components are automatically extracted from the received application package for installation at the accessory device 130. The extracted components are illustrated in FIG. 3 as the accessory application 132. The interface definition of the application package, to be installed at the accessory device, defines display values for a display of the accessory device. The stub application of the application package comprises programming code, such as a script, that upon execution loads a device framework, which include code to interpret the interface definition and create display interface elements to provide the accessory device application functionality. These components of the accessory application 132, the interface definition and the stub application, are described further below. The companion device extension of the application package operates to determine the display values of the interface elements.

In accordance with embodiments, the package generating application 112 determines received device applications that are intended for operation at an accessory device, such as submissions that include an appropriate interface definition, and automatically generates a corresponding application package that includes components such as a companion device application and companion device extension. The application package identifies an application for operation on the accessory device, such that the application package includes components comprising a companion device application, the companion device extension, the accessory device stub application, and the interface definition. The respective device daemons are included with the operating system of their respective device and support communication between the devices, based on a mutually known identifier associated with the components in the application package, such as the accessory device application name.

The companion device 120 includes a companion device application 122 that comprises an installed application package such as described above. More particularly, the companion device 120 receives, for installation, an application package that includes components comprising the companion device application, the companion device extension, the accessory device stub application, and the interface definition. As noted, the application package components are configured to operate with a mutually known identifier. When the companion device 120 installs the application package, the companion device sends an indication to the server device 110 that the application package has been installed on the companion device, such that the components comprising the accessory device stub application and the interface definition have been sent to an accessory device 130 for installation. In this way, the installation of the companion device application is registered with the server 110.

The double-headed arrows 150, 160 in FIG. 1 indicate network connections for communication between the server device 110 and the companion device 120, and between the companion device 120 and the accessory device 130. The connections may comprise a wired network connection, or a wireless network connection, or a combination of the two types of connection.

The accessory device 130 can be a wearable accessory device, for example. Wearable accessory devices can be implemented in any wearable article. For example, the accessory device 130 can be implemented as or within a watch, a bracelet, a necklace, a ring, a belt, a jacket, glasses, goggles, headphones, ear buds, hearing aids, or the like, or can be placed inside and attached to such articles. The companion device 120 and the accessory device 130 can be any kinds of portable electronic devices, such as a portable music player, a digital camera, a laptop computer, a tablet computer, a digital audio recorder, enhanced reality goggles, headphones, earpieces, or a smart phone, for example. The devices 120 and 130 can be the same or different kinds of devices.

II. Producing an Application Package

Figure 2:
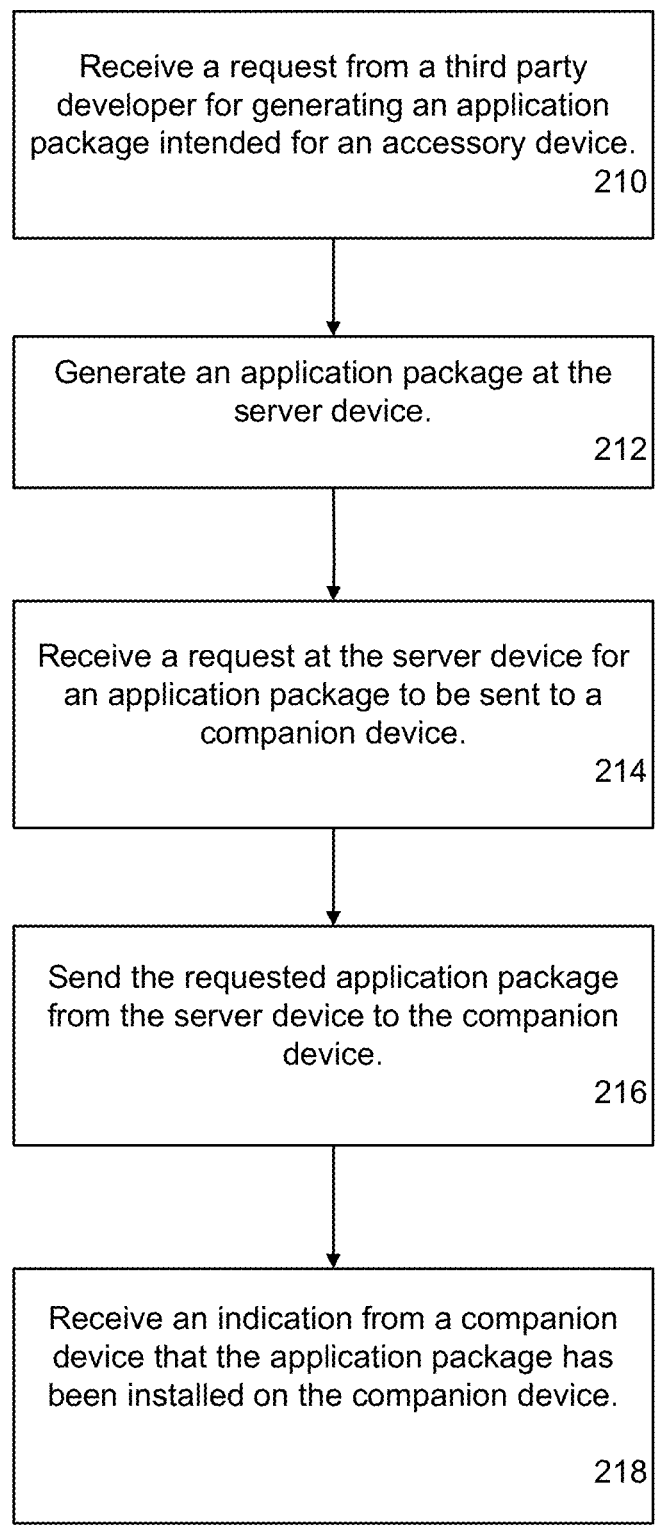
FIG. 2 is a flowchart representation of operations performed by a server computer device such as illustrated in FIG. 1.

FIG. 2 shows a flowchart representation of operations performed by the server computer device 110 with respect to the companion device 120 and accessory device 130 such as illustrated in FIG. 1 for producing an application package. FIG. 3 illustrates the systems and structures 300 involved in the FIG. 2 operation, including a third party developer 310, the server computer device 110, the companion device 120, and the accessory device 130.

In the operation 210 of FIG. 2, the server computer 110 receives an accessory device stub application 312 and an accessory device interface definition 314. The stub application generates events, commands, and display values through referencing, calling, or executing program code of a library, or framework, in response to notifications and user interaction with the device, in accordance with the interface definition 314. The stub application 312 may be implemented as, for example, a script or program call that can be executed by a processor of the accessory device. The events and commands and display values are sent from the accessory device to the companion extension at the associated companion device via respective communication daemons 320, 322 of the devices. The companion extension receives the events and user commands, and generates updated display values for the accessory device display. In response to receiving the accessory device stub application 312 and interface definition 314, the server computer 110 generates an application package intended for the accessory device 130. The server may receive, in addition to the accessory device stub application 312 and interface definition 314, a request to generate the application package from the third party developer 310 of the accessory device stub application 312 and interface definition 314. The request is not a prerequisite for the server computer to generate the application package.

The accessory device stub application 312 and interface definition 314 comprise an accessory device application file and are intended for storing at the intended accessory device. The accessory device includes an operating system with an accessory device daemon 320 that manages wireless communications between the accessory device 130 and the associated companion device 120. The stub application 312 provided by the third party developer 310 comprises a small amount of code that is executed by the accessory device with minimal demand on accessory device resources such as processor operations and data storage. The interface definition 314 provided by the third party developer comprises data that defines aspects of the user interface that is used by the accessory device 130. For example, the data can include data values that are used to display buttons, text fields, and other user interactive artifacts to be displayed on a display of the accessory device.

Upon receiving the accessory device stub application 312 and interface definition 314 from the third party developer 310, the server device 110 stores them as an accessory device application file 332. The accessory device application file includes an identifier, as indicated by identification data in the accessory device interface definition 314. For example, the identifier may define an accessory device application name.

In the operation 212 of FIG. 2, the server device 110 uses its package generating application 112 to generate application code corresponding to the identified application name. The application code that is generated includes a companion application 334 and companion extension 336. The companion application 334 is for execution at the companion device 120 in support of the accessory application 312, the companion extension 336 is for determining the proper companion application and framework elements at the companion device 120 in support of the accessory application.

The application code and the accessory device application file comprise an application package. The application package components of the companion application 334, companion extension 336, and accessory device application file 332 share a common accessory application identifier comprising the application name or an assigned application number or other suitable indicia by which all the package components can be understood by a computing device as being associated with the same accessory application. The application package components are configured to operate with the mutually known application identifier. The application package components comprise multiple files that may be separately stored, transmitted, and identified in a computer environment, but the application package itself is generated as a single file that may be stored and transmitted and identified under one file name.

After the application package is generated, at the box 212, the application package is available from the server computer 110 for download and installation at companion devices. The application identifier can be publicized and made known to users, who may wish to obtain the identified application for installation on their accessory device, from their companion device. That is, the application package may be marketed and identified as being for an accessory device, but the application package with companion device components may be obtained through an online store that caters to companion devices.

In the operation 214, the server device 110 may receive a request for the application package from a user who wishes to install the accessory application at an accessory device. The request may be, for example, in the form of a download request from a user through an online store with an application download interface.

At the operation box 216 of FIG. 2, the server device 110 may respond to the received request for the application package by sending to the companion device 120 the identified accessory device application package 362.

Upon receiving the accessory device application package 362, the companion device 120 automatically extracts the components using its operating system. The extracted components include the accessory device application file 332, the companion application 334, and the companion extension 336. When these components are extracted and installed on the companion device, the companion device notifies the server device 110 that the application has been received and installed, as is usual for installation of a downloaded device application.

In the operation 218, after the accessory device application package 362 has been installed at the companion device 120, and once the companion device has come into communication with an accessory device 130, the companion device may send the components comprising the accessory device stub application 312 and the interface definition 314 to the accessory device 130 for installation. If desired, the accessory device or companion device may first inquire of the user if installation is desired, by a suitable query on the display of the respective device. An affirmative response will result in storing the accessory device stub application 312 and the interface definition 314 at the accessory device, a negative response stops any such storing activity. If storage is desired, at the accessory device 130, the extracted accessory device stub application 312 and the interface definition 314 are received from the companion device 120 and are stored.

The double-headed arrows 340, 350, 370 in FIG. 3 indicate network connections for communication between the third party developer 310 and the server device 110, between the server device and the companion device 120, and between the companion device and the accessory device 130. The connections may comprise a wired network connection, or a wireless network connection, or a combination of the two types of connection.

III. Installing the Companion Application

Figure 4:
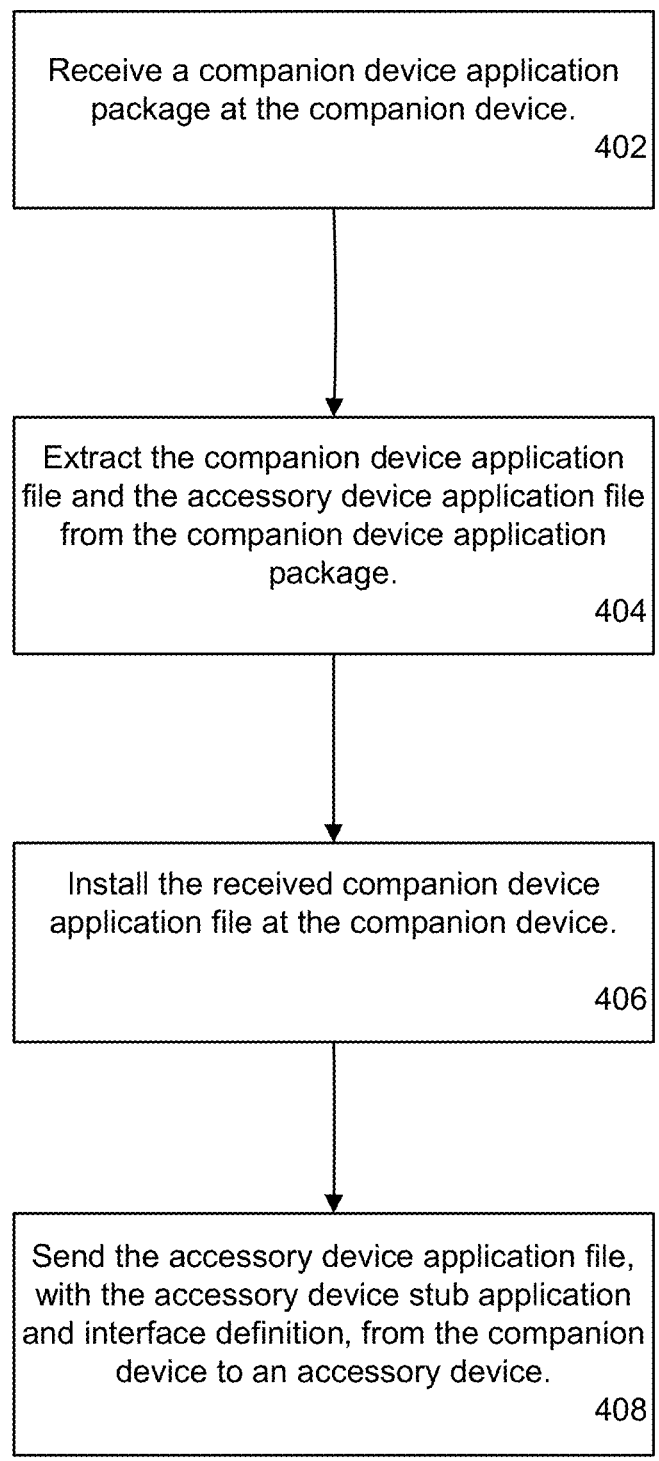
FIG. 4 is a flowchart representation of operations for installing an application package at a mobile computer device such as illustrated in FIG. 1.
Figure 5:
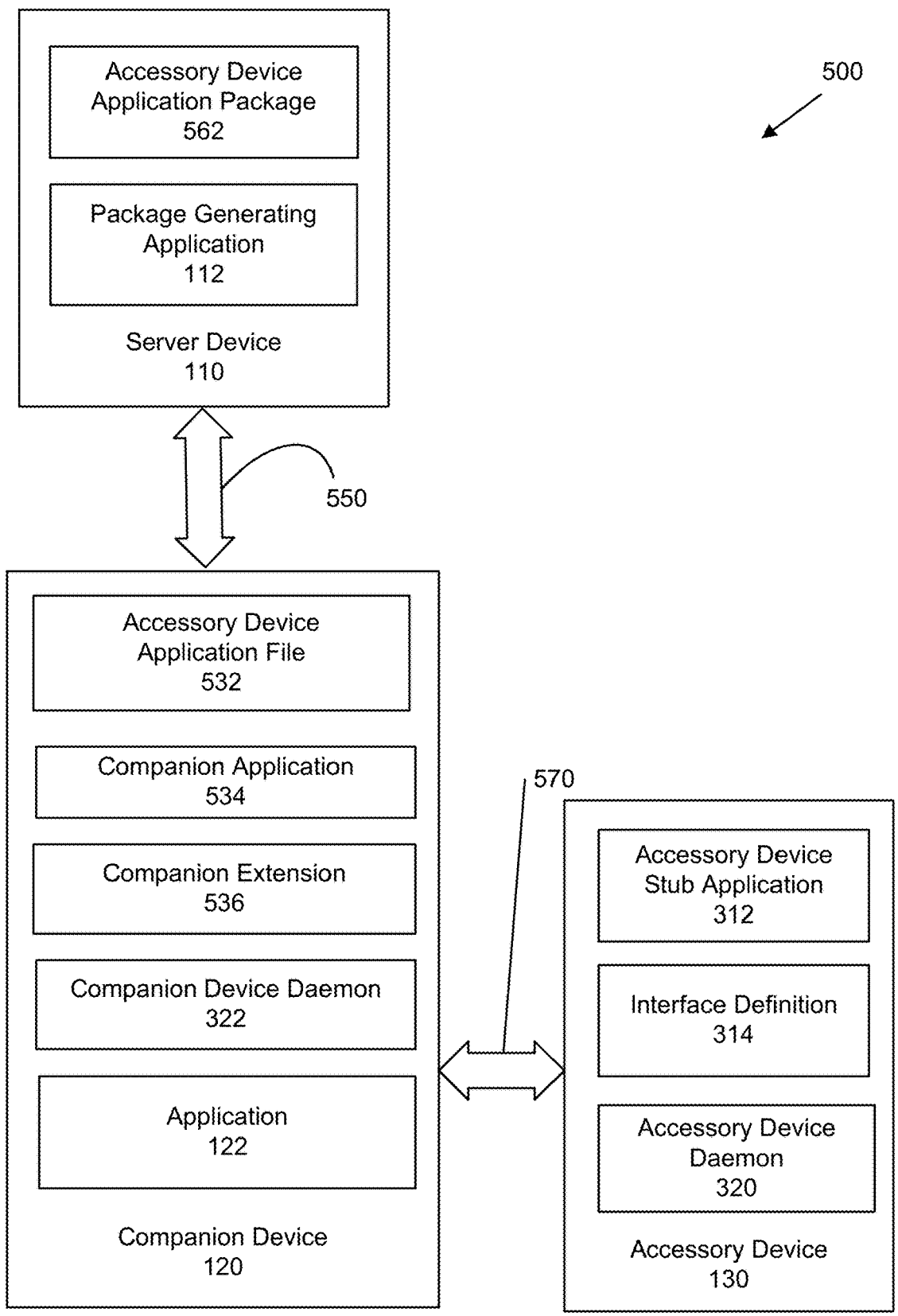
FIG. 5 is a block diagram that illustrates the devices that perform the operations illustrated in FIG. 4.

FIG. 4 is a flowchart representation of operations for installing an application package at a mobile computer device such as illustrated in FIG. 1. FIG. 5 illustrates the systems and structures 500 involved in the FIG. 4 operation, including the server computer device 110, the companion device 120, and the accessory device 130.

In the FIG. 4 operations of box 402, the companion device 120 receives an accessory device application package 362 for use with an associated accessory device 130. As discussed above, the accessory device application package components include the accessory device application file 332, the companion application 334, and the companion extension 336. When the companion device 120 receives the application file, it automatically inspects the code contained in the application file 332, according to the operating system of the companion device. The inspection will reveal to the companion device if the application file 332 includes the additional code and data intended for the accessory device, such as the accessory device stub application 312 and interface definition 314, by virtue of the application name identifier or similar information in the application file. If the verification fails, then the companion device can provide a system message to inform the user, and/or notification and failure processing may commence at the companion device.

In the next operation 404, the companion device 120 extracts the accessory device application package components. The extracting operation may include a verification or authorization action to validate the stub application. For example, the companion device may perform a check for a proper application identifier. The extracting operation, and any verification of the components, may be managed by the operating system of the companion device.

At the operation of box 406, upon verification, the companion device 120 installs the accessory device application package 362. The installation may comprise storing the components at appropriate storage locations of the companion device memory. FIG. 5 shows that the components of the accessory device application package 362 received at the companion device 120 include an application file 532, a companion device application 534, and a companion extension 536. The application file 532 also includes an accessory device stub application 312 and an interface definition 314, both of which are stored in the associated accessory device 130, as described further below.

At the operation 408, the companion device 120 sends the accessory device application file 532 to the accessory device 130 for installation. Before the installation operation 408, as part of the box 406 operation, the companion device 120 or the accessory device 130 may display an inquiry message to request confirmation of the installation prior to installing the file contents in the accessory device. The framework data stored in the companion device memory may also be stored in the accessory device, in accordance with the companion device operating system and accessory device operating system. Alternatively, the framework data may be stored in the companion device and called for by the accessory device only when needed. In this way, the accessory device may conveniently utilize the resources of the companion device without consuming accessory device resources.

The double-headed arrows 550, 570 in FIG. 5 indicate network connections for communication between the server device 110 and the companion device 120, and between the companion device 120 and the accessory device 130. The connections may comprise a wired network connection, or a wireless network connection, or a combination of the two types of connection.

IV. Installing the Accessory Application File

Figure 6:
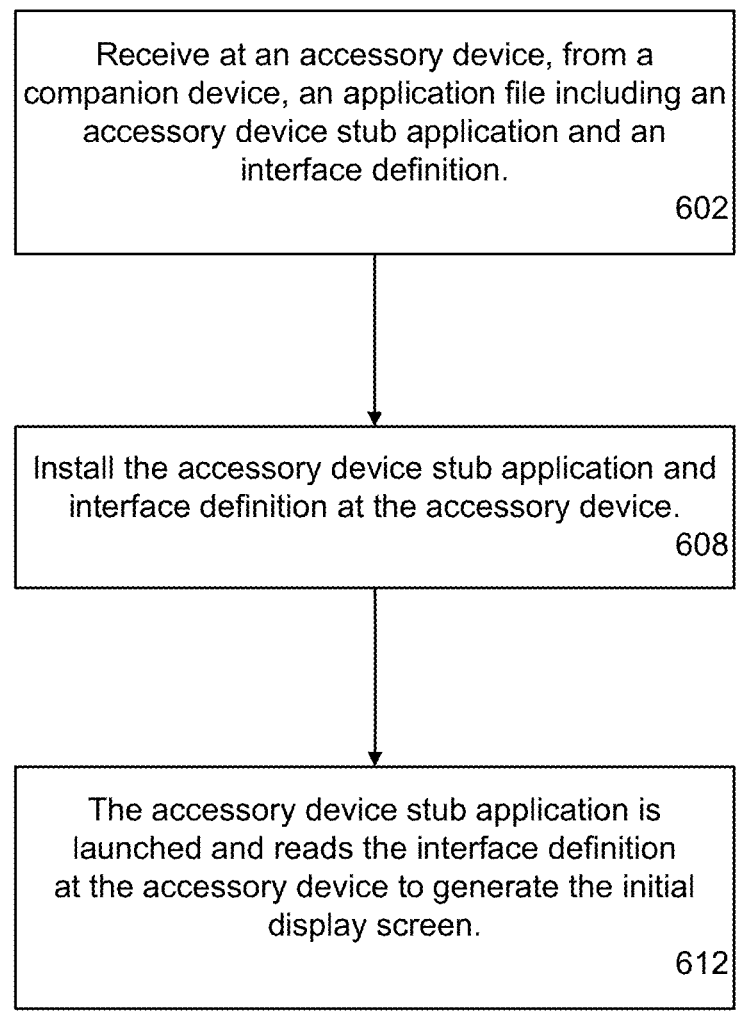
FIG. 6 is a flowchart representation of operations for installing an accessory application file at an accessory computer device such as illustrated in FIG. 1.
Figure 7:
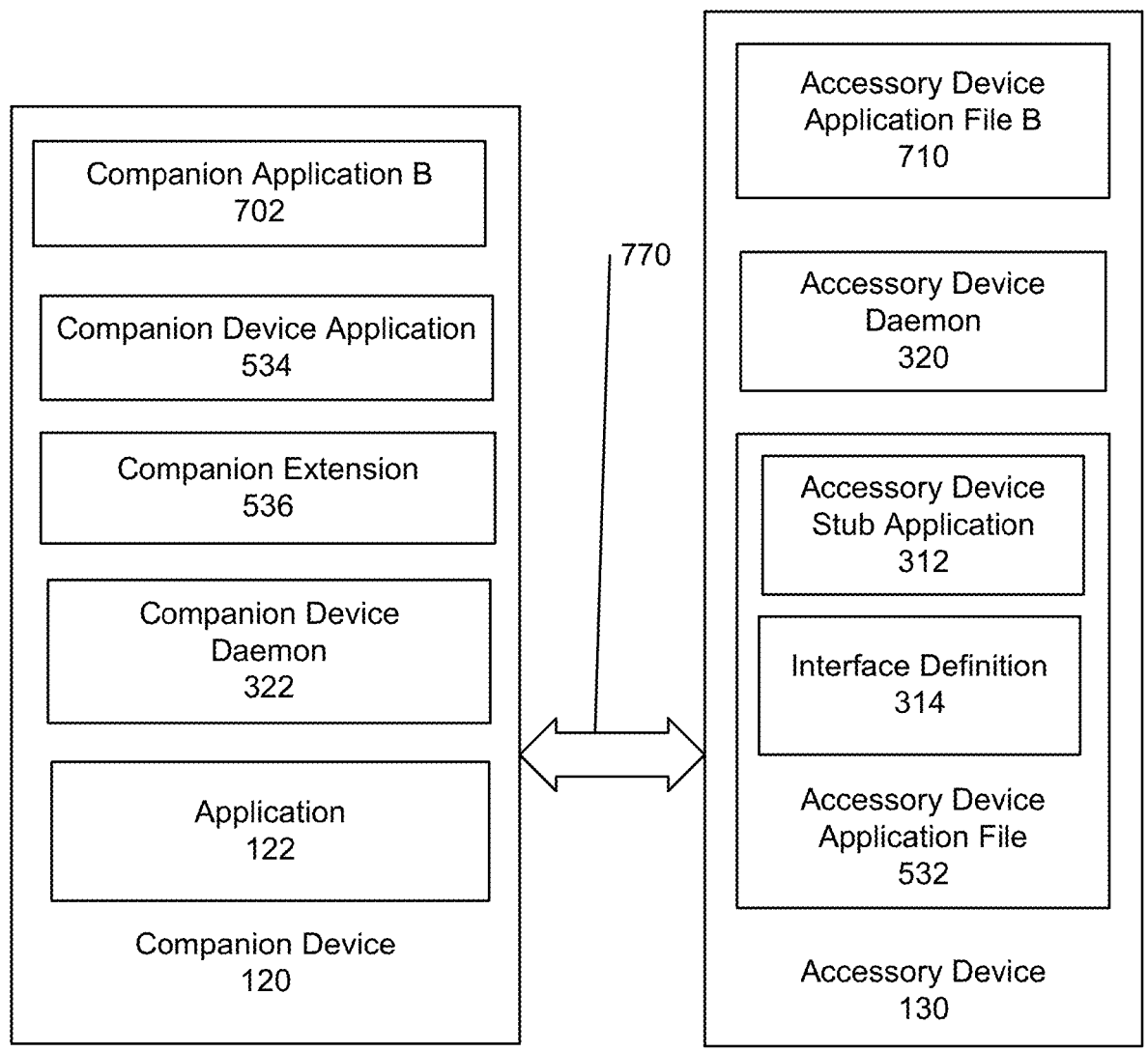
FIG. 7 is a block diagram that illustrates the devices that perform the operations illustrated in FIG. 6.

FIG. 6 is a flowchart representation of operations performed by an accessory computer device such as illustrated in FIG. 1 for installing the accessory application. FIG. 7 illustrates the systems and structures 700 involved in the FIG. 6 operation, including the companion device 120 and the accessory device 130.

At the operation 602, the accessory device receives an accessory device application file 532 from an associated companion device 120. As illustrated in FIG. 7 and described above, the accessory device application file 532 includes the accessory device stub application 312 and an interface definition 314 for operating the accessory device in a desired manner. As noted above, the stub application includes program code comprising, for example, a script that can be executed by a processor of the accessory device, while the interface definition includes alphanumeric data that defines display artifacts and their properties and includes a framework for generating a display screen or window for the accessory device. The accessory device application file 532 may also be referred to as the "accessory application" that, as noted, includes the accessory device stub application 312 and the interface definition 314, and communicates with the accessory device daemon 320. The accessory device application file 532, which comprises an executable file that includes the companion device extension and the accessory device application with the accessory device stub application, once installed is involved in receiving user events and display data based on the interface definition 314.

In the operation 608, the accessory device 130 installs the accessory device stub application 312 and interface definition 314 received from the companion device 120. The installation may comprise storing these components at appropriate locations of accessory device memory. The storing to the accessory device may be initiated and implemented by command of the associated companion device, or it may be implemented by the accessory device, as known to those skilled in the art.

In the operation 612, upon installation of the accessory device stub application 312 and interface definition 314, the accessory device stub application may be automatically launched. As part of the initial launch of the stub application, a message may be sent from the accessory device to the companion device 120 to confirm the installation has completed. The companion device will know which accessory device application has been installed, because of the application name identifier that is common among the components of the application package discussed above. The companion device may, in turn, register the confirmation of accessory application installation to the server computer 110. At box 612, once the accessory device stub application 312 is launched, it reads the interface definition.

As noted above, the respective daemons 320, 322 of the devices 130, 120 may handle communications (i.e., route messages) for multiple applications. The application identifier is used by the daemons to route messages to the intended and appropriate application among the multiple applications that might be installed on the devices. For example, if the companion device includes a second application, illustrated in FIG. 7 as the Companion Application B 702, the companion device daemon 322 will receive application messages and will route the application messages to the appropriate application, such as either the companion device application 534 or Companion Application B 702, in accordance with the application identifier that is contained in the respective application messages. Thus, the solitary companion device daemon 322 may route messages for multiple applications installed at the companion device 120. The companion device daemon 322 is typically included in the OS, but is not typically enabled until an accessory device is paired with the companion device, via launching an accessory device application 532. A similar operation may hold for the accessory device 130. For example, if the accessory device 130 includes a second application, illustrated in FIG. 7 as the Accessory Device Application File B 710, then the accessory device daemon 320, which is included in the accessory device OS, will properly route messages, using the application identifier.

The double-headed arrows 770 in FIG. 7 indicate network connections for communication between the companion device 120 and the accessory device 130. The connections may comprise a wired network connection, or a wireless network connection, or a combination of the two types of connection. The various components described above communicate, as noted, over these network connections. That is, the companion device application 534 contains the companion extension 536 and the accessory application 532, with the accessory device stub application 312 and the interface definition 314, and is installed via the server device 110 and companion device 120 but is not directly involved during execution of the companion application. The companion extension 536 communicates with the companion device daemon 322 and is involved in generating data to display at the accessory device and in responding to user events. The companion extension 536 is typically supplied by a third party and contains code supplied by the third party for the operation of the companion extension. The companion device daemon 322 communicates with the accessory device daemon 320 and manages the installation of the accessory device application 532, starting the companion extension 536 on request from the accessory device daemon 320, and communicates with the companion extension 536. The companion device daemon 322 is typically included in the companion device 120 as native (installed) code. The accessory device daemon 320 communicates with the accessory device application 532 and with the companion device daemon 322, and is typically included in the accessory device 130 as native (installed) code.

V. Updating the Display of the Accessory Device

Figure 8:
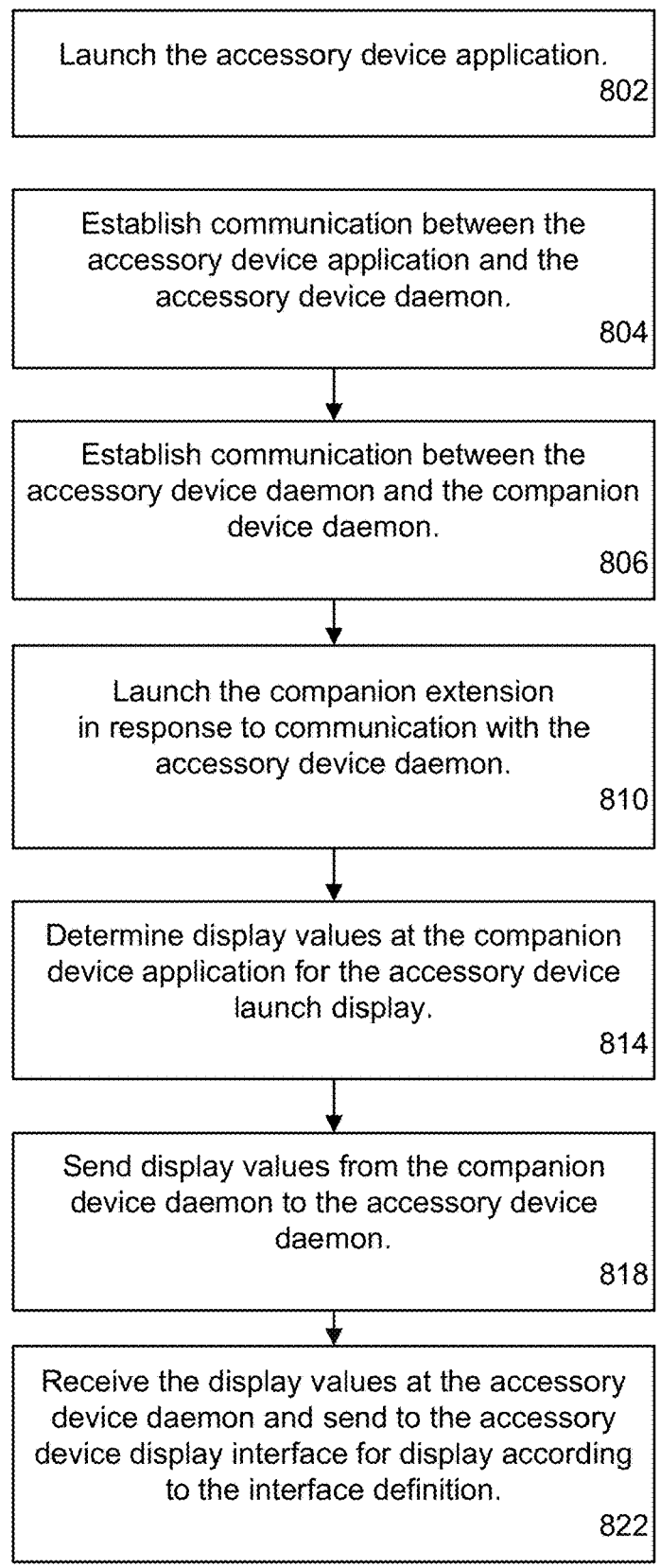
FIG. 8 is a flowchart representation of operations for determining the initial display upon launch of an accessory device such as illustrated in FIG. 1.
Figure 9:
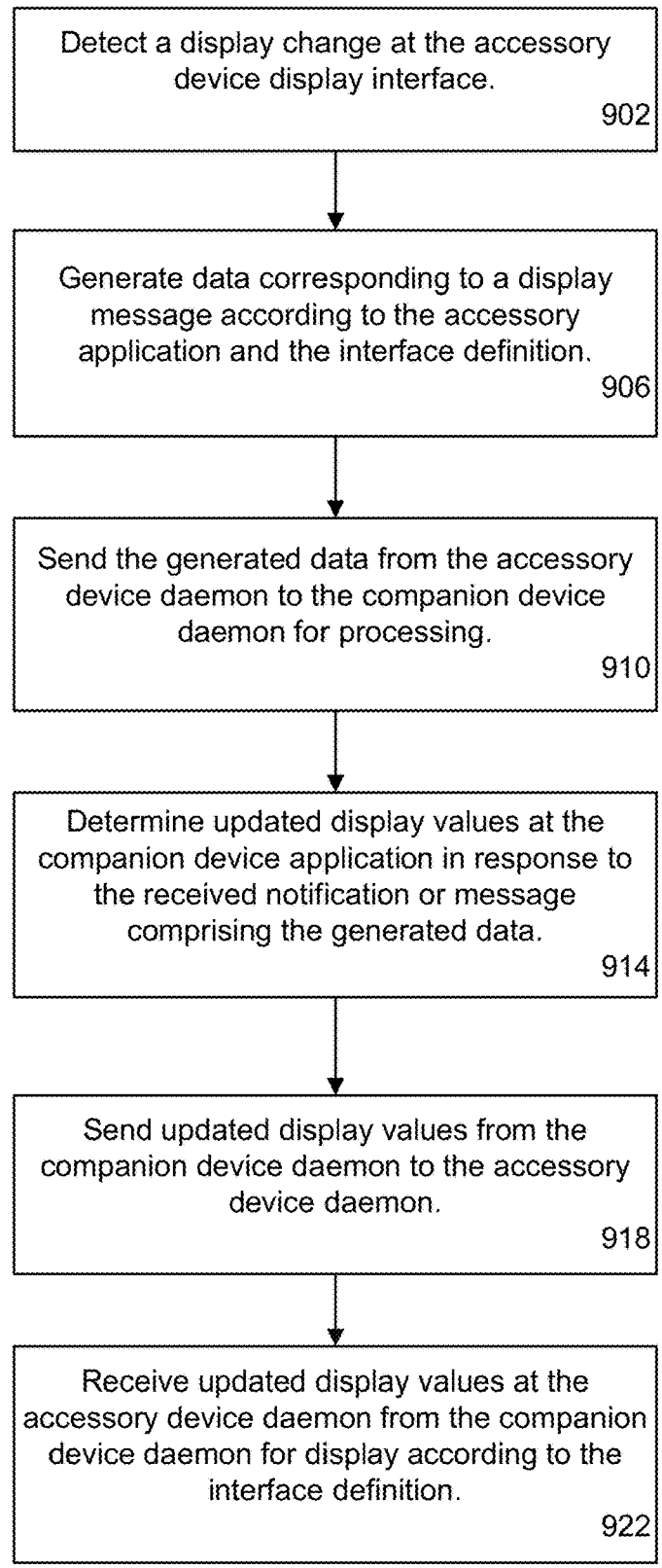
FIG. 9 is a flowchart representation of operations for updating the display of an accessory device such as illustrated in FIG. 1.
Figure 10:
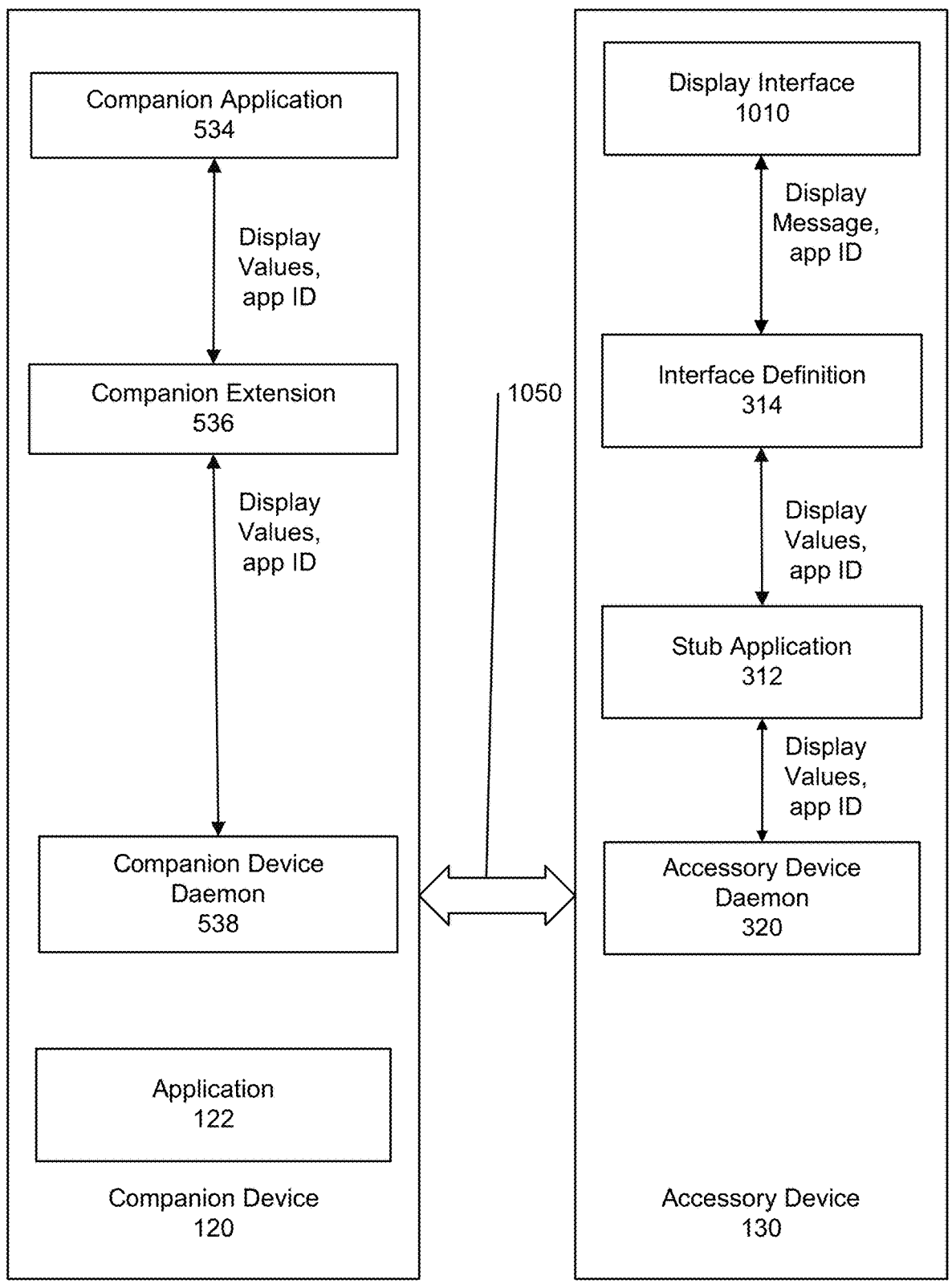
FIG. 10 is a block diagram that illustrates the devices that perform the operations illustrated in FIG. 8 and FIG. 9.

FIG. 8 is a flowchart representation of operations for updating the display of an accessory device such as illustrated in FIG. 1, for a launch display. FIG. 9 is a flowchart representation of operations for updating the display of an accessory device such as illustrated in FIG. 1, after a launch. FIG. 10 is a block diagram that illustrates the devices that perform the operations illustrated in FIG. 8 and FIG. 9.

The companion device application 534 (FIG. 10) may receive information messages and notifications from the companion extension 536. Some of the received messages and notifications may be intended for the accessory device. The received messages and notifications may comprise system alerts, warnings, acknowledgements, and other system-generated messages. The received messages and notifications may be prepared by the companion extension for display at the accessory device or for display at the companion device, or both, as determined by programming of the companion device application 534.

The companion extension 536 includes programming code that, when executed by the companion device 120, determines display values for display at the accessory device 130. The companion extension 536 determines the display values in accordance with framework data that is stored in the companion device, which the extension automatically accesses through an operating system of the companion device. The framework data may be supplied by the developer of the application file, or may be supplied by a server or other source of information, or may comprise framework elements that are included with the operating system of the companion device, or may comprise a combination of components from such sources. The application framework data accessed by the extension defines display artifacts such as, for example, display buttons, windows, text boxes, backgrounds, wallpaper, and the like.

The companion device daemon 538 includes programming code that, when executed by the processor of the companion device 130, provides an interface for communication between the companion device application and the accessory device application. That is, the companion device daemon receives messages from the accessory device daemon and passes the received messages to appropriate components of the companion device, and also receives data intended for the accessory device from components of the companion device, and prepares corresponding messages that include the data for sending to the accessory device 130.

In the operation 802, the installed accessory application has been launched, either by the user or by the accessory device upon initial installation of the accessory device application file. More particularly, the accessory application is automatically launched after the installation of the accessory device application file at the accessory device is complete and the accessory device stub application 312 and interface definition 314 are installed and ready for operation, as discussed above in Section IV.

As noted above, the accessory device application launch comprises execution of the accessory device stub application 312, so that the framework of display artifacts and associated application data is accessed, as needed, at the accessory device. The accessory device interface definition 314 may be accessed, as well. At the box 804, communication is established between the accessory device application 312 and the accessory device daemon 320. Thus, launching the accessory application executes the accessory device stub application 312 and accesses the associated framework and interface definition 314. The accessory device stub application may also perform code checking and authorization tasks. That is, the accessory device stub application may validate the received application file by examining code information in the file, and such information may be hashed, signed, and validated. In this way, the application file and associated information may be validated at each launch of the accessory device application.

At the box 806, launching the accessory device stub application 312 causes the accessory device daemon 320 to establish communication with the companion device daemon 538. The accessory device daemon will provide the accessory application identifier described above to the companion daemon, thus ensuring that the data values and other communications from the accessory device will be directed to the proper companion application by the companion daemon. The accessory device daemon 320 will also provide the companion device 120 with display values and other information necessary for the companion device to determine display values for the accessory device display.

In the operation of the box 810, the companion device daemon 538 causes the companion extension 536 to be launched, in response to establishment of communication with the accessory device 130. This begins the processing at the companion device for determining display values for the initial display at the accessory device.

In the operation 814, initial display values are determined. The companion device application 534 and companion extension 536 can utilize the resources of the companion device 120 to determine the initial display values, based on the information received from the accessory device through the companion daemon 538 and the framework data stored in the companion device as part of the companion operating system and/or the installation of the accessory device package.

At the box 818, the determined initial display values are sent from the companion device 120 to the accessory device 130. More particularly, the companion application 534 and companion extension 536 determine the display values and then pass the display values along to the companion device daemon. The initial display values are sent from the companion daemon to the accessory device daemon.

At the box 822, the accessory device daemon 320 receives the initial display values and causes a corresponding display screen to be generated at the accessory device 130 in accordance with the interface definition 314. The accessory device may format the received values to a display message suitable for the accessory display interface 1010 to generate an appropriate display. The initial display values are used by the accessory device stub application 312, in accordance with the display specifications of the interface definition 314, to generate the display artifacts for showing on the accessory device display. For example, an application screen or window of the accessory device display may include a variety of display elements that may or may not be grouped, which may comprise buttons, text boxes, windows, links, and the like. Such display elements may be either fixed artifacts, or elements that are changed or adjusted on-the-fly, during execution of the application. The interface definition may specify, for example, display buttons and their titles, locations, size, color, and number. The companion application and/or extension can be responsible for changing such properties, in accordance with information received from the accessory device, and in accordance with the accessory application identifier. Thus, the companion device application and/or extension may generate initial display values and provide them to the accessory device. The interface definition of the accessory device ensures that the updated values will be properly displayed, in accordance with the stub application and interface definition data, and the accessory application identifier.

During normal operation of the accessory device 130, after initial launch, the companion device 120 continues to receive notifications and messages, and continues to determine display values for the accessory device. For the initial launch as described above for FIG. 8, the companion device may respond to notifications and messages initiated by the companion device operating system. After the initial launch, the companion device may generate updated display values in response to received notifications and messages, which may be produced and delivered to the companion device in response to user interaction at the accessory device or, or may be produced in response to system-generated or device-generated messages. Such updated display values may result in display changes at the accessory device. The handling of these after-launch display changes is illustrated in FIG. 9.

In the operation of box 902, a display change at the accessory device 130, due to a user interaction or an update notification or message, is detected by the accessory device stub application 312 at the accessory device. The display change may comprise changed display values or properties from the display interface 1010 in response to a user interaction with the display of the accessory device, or may comprise an activation or change in a sensor value, or some other circumstance that causes the display values at the accessory device to be changed.

At the box 906, the accessory device stub application 312 generates a display message in response to the display change, in accordance with the interface definition and accessory application. The accessory device stub application 312 may also determine the accessory application identifier, as described above. More particularly, when the accessory device stub application 312 is launched, the framework of display artifacts and associated application data is accessed by the stub application. The information accessed by the accessory device stub application permits the stub application to generate the proper display data, which is provided to the accessory device daemon 320.

In the operation 910, the generated data received at the accessory device daemon 320 is packaged into a data message, with application identifier, and is sent from the accessory device daemon to the companion device daemon 322.

In the operation 914, the data message is received at the companion device daemon 322 and is provided by the companion daemon to the companion device application 534 and companion extension 536, in accordance with the application identifier. The companion application and companion extension determine updated display values in response to the received data message. The updated display values are provided to the companion daemon for transport over the network to the accessory device.

At the box 918, the updated display values are sent by the companion device daemon 322 to the accessory device daemon 320. The companion device daemon knows the destination accessory device daemon because of the application identifier received in the incoming data message.

At the box 922, the accessory device daemon 320 receives the updated display values from the companion daemon 322.

The updated display values can be passed to the accessory device interface definition, and data for display by the display interface 1010 is generated accordingly. The data is generated in accordance with processing determined by the developer of the accessory application 132 that is installed at the accessory device 130. As noted above, the accessory application 132 includes an accessory device stub application 312 and an accessory device interface definition 314. The display data may define a change, for example, arising from user interaction with the accessory display, such as a button press, or arising from a system notification or message, such as an alert. The accessory device daemon utilizes the application identifier of the accessory application in processing the display message.

More particularly, the updated display values are used by the accessory device stub application, along with the interface definition, in accordance with the display specifications of the interface definition, to generate the display artifacts for showing on the accessory device display. For example, an application screen or window of the accessory device display may include a variety of display elements that may or may not be grouped, which may comprise buttons, text boxes, windows, links, and the like. Such display elements may be either fixed artifacts, or elements that are changed or adjusted on-the-fly, during execution of the application. The interface definition may specify, for example, display buttons and their titles, locations, size, color, and number. The companion application and/or extension can be responsible for changing such properties, in accordance with information received from the accessory device, and in accordance with the accessory application identifier. Thus, the companion device application and/or extension may generate updated display values and provide them to the accessory device. The interface definition of the accessory device ensures that the updated values will be properly displayed, in accordance with the stub and interface definition data, and the accessory application identifier.

Thus, the updated display values are calculated at the companion device in accordance with data passed to the companion device through the accessory device daemon and companion device daemon. The calculated updated display values are passed from the companion daemon back to the accessory device daemon, where the display changes are used by the display interface 1010 to produce the appropriate display. In this way, the accessory device may conveniently utilize the resources of the companion device to update its display.

VI. Notifications at the Accessory Device with Custom User Interfaces

Figure 11:
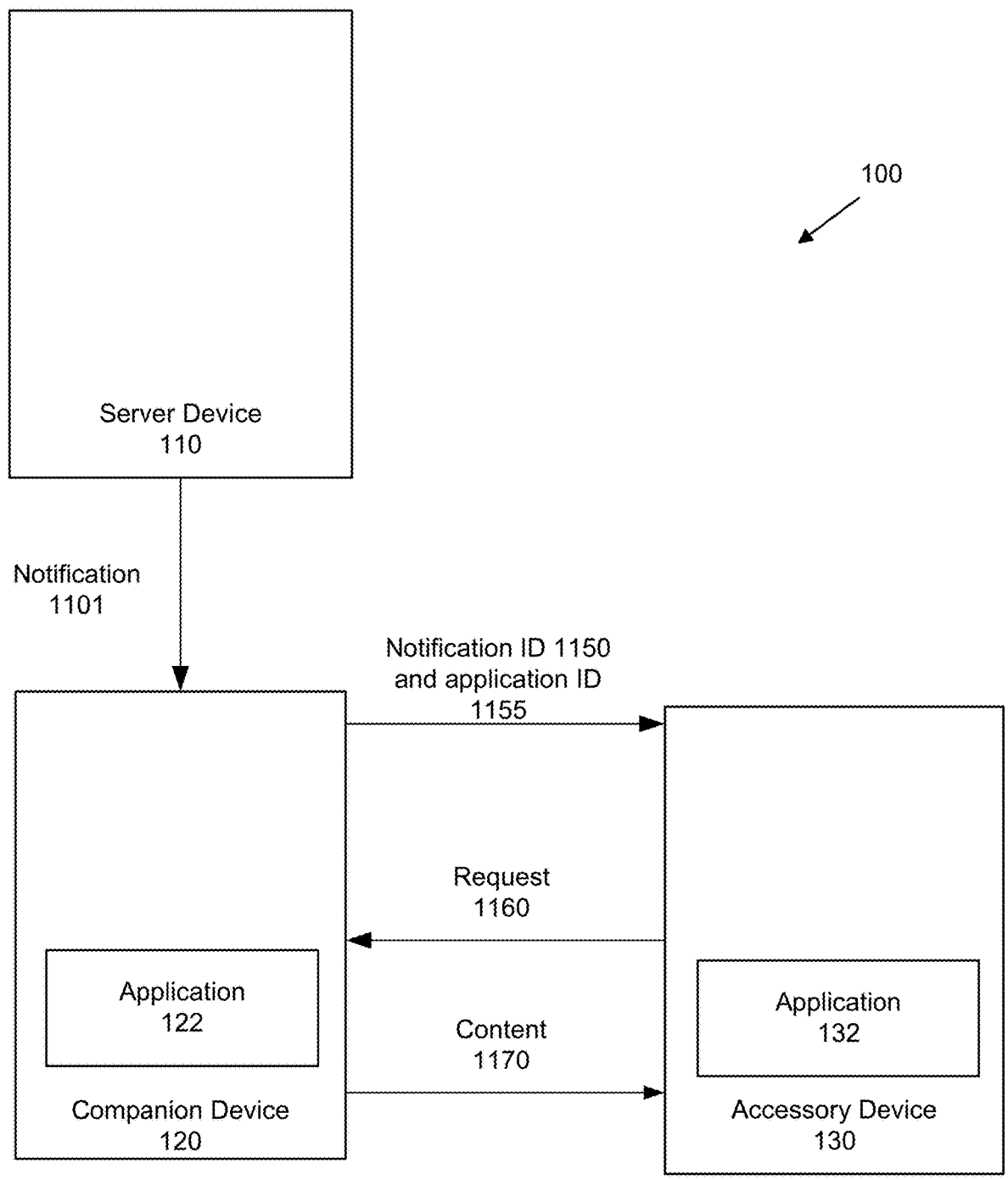
FIG. 11 is a block diagram that illustrates the companion device sending a notification to the accessory device for the devices illustrated in FIG. 1.

FIG. 11 is a block diagram of the FIG. 1 system 100 that illustrates the companion device 120 receiving a notification 1101 intended for the accessory device 130. The companion device 120 may, from time to time, receive notifications (also referred to as bulletins) that are intended for an application 132 installed at the accessory device 130, whether or not the accessory application is being executed (run). Some of the notifications may be intended for a class of accessory applications that may provide a custom user interface appearance. Such notifications are processed according to the following description.

The notification 1101 can be sent via network connections for communication between the source of the notification (represented as the server device 110) and the companion device 120. Notification information including a notification identifier 1150 and an application identifier 1155 from the notification 1101 are retrieved to identify the accessory application for which the notification is intended. The notification ID 1150 and application ID 1155 are directed to the appropriate accessory device application. The accessory device 130 determines user interface and display properties for the notification, and sends a request 1160 for external (dynamic) user interface and display properties from the companion device, as needed for display of the notification at the accessory device. The content 1170 that is received back from the companion device is combined with the notification ID 1150 and application ID 1155, and a notification display is generated at the accessory device 130.

Figure 12A:
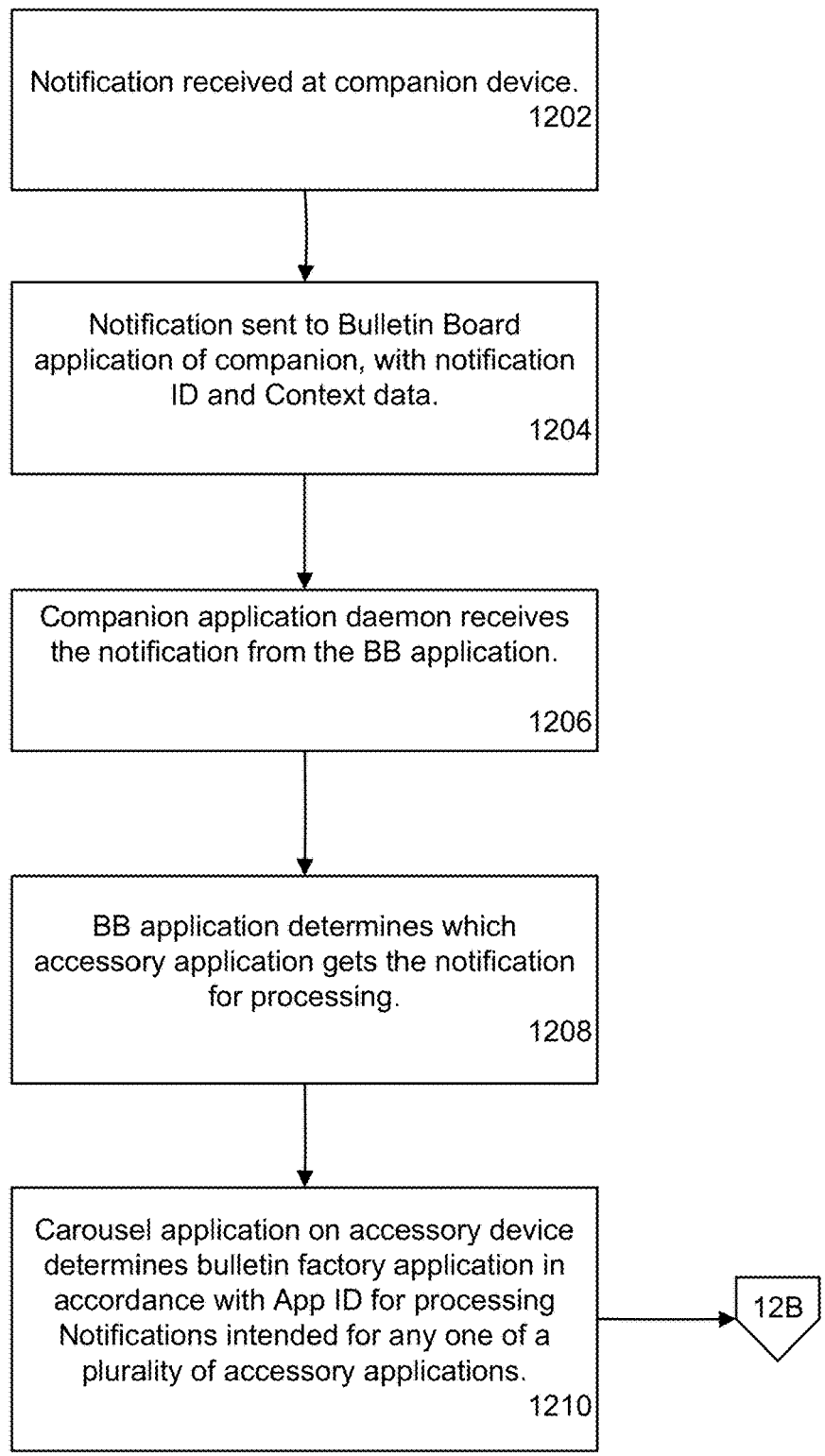
FIGS. 12A and 12B comprise a flowchart representation of operations for processing notifications received at the companion device intended for display at an accessory device with a custom user interface, such as at the devices illustrated in FIG. 11.
Figure 12B:
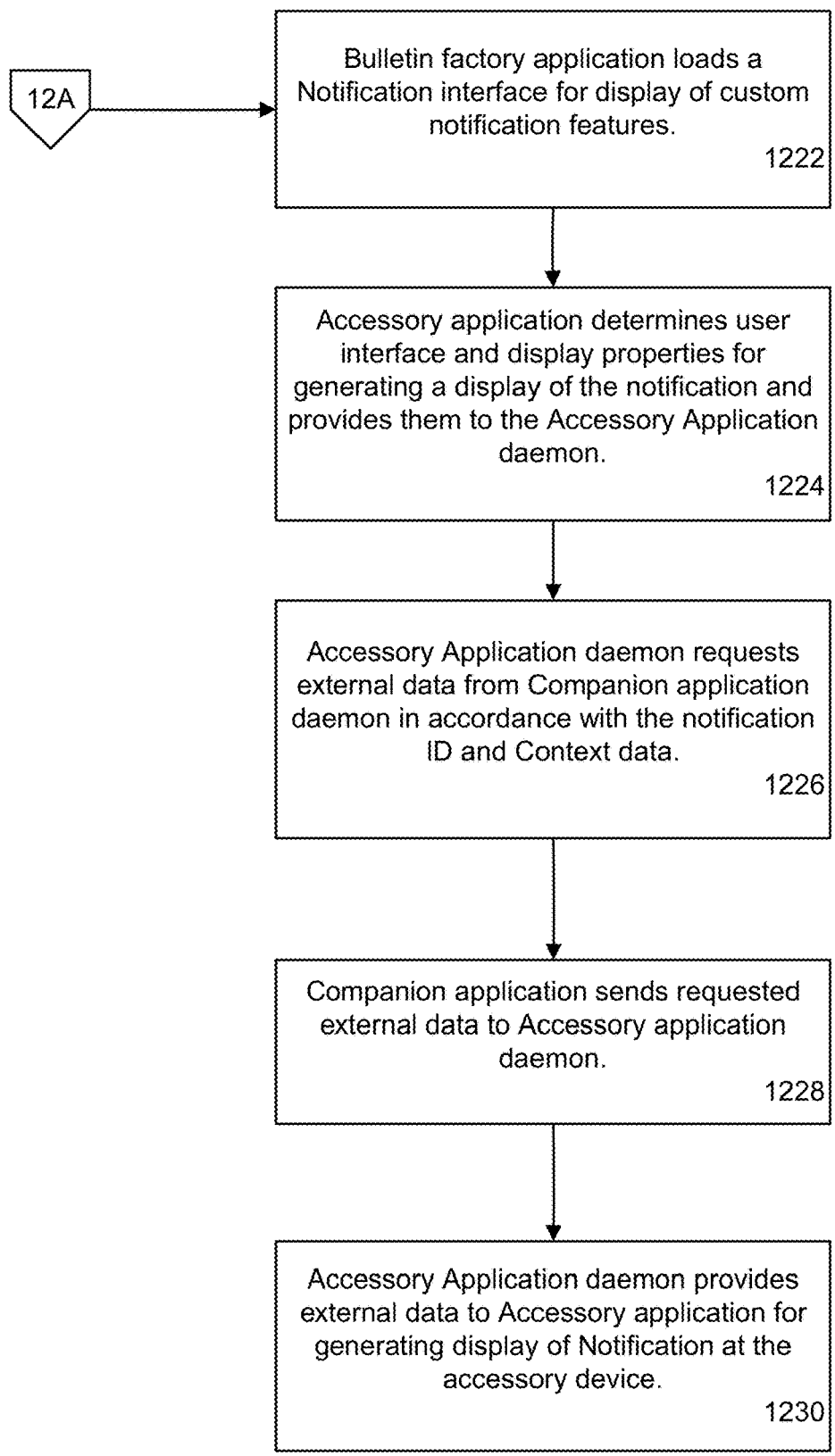

FIGS. 12A and 12B comprise a flowchart representation of operations for processing notifications received at the companion device intended for display at an accessory device with a custom user interface, such as at the devices illustrated in FIG. 1. Certain operations are performed by the companion device and certain operations are performed by the accessory device. Operations by either device can vary.

At box 1202, a notification is received at a companion device. The notification is intended for display on an associated accessory device that is in communication with the companion device over a wireless network connection. The accessory application may, or may not be, executing at the time the notification is received at the companion device. After processing, the notification is displayed on the accessory device in accordance with a notification interface that is specified by the developer of the accessory application, as described further below. The notification is received at a message handling daemon of the companion device for appropriate distribution.

In the operation of the box 1204, the notification is sent from the message daemon to a notification processing application, such as a Bulletin Board application ("BB application") of the companion device. The BB application processes the notification to ensure that it is properly examined and its contents properly directed for handling. The notification includes multiple data fields, including a data field that contains a notification identifier (e.g., which can be a unique ID) of the particular notification, and a data field that contains context data for the notification. The context data is stored in memory of the companion device for late retrieval and for directing the distribution of the notification, as described further below. Thus, after receiving a notification at a message handling daemon of the companion device, wherein the notification is intended for an accessory application at an accessory device, the daemon directs the received notification to the companion device BB application, which determines the notification ID of the notification. The BB application can be any application that is configured to receive notifications intended for the accessory device. In one implementation, the BB application can also receive notifications that are intended for the companion device.

At the box 1206, a companion application daemon gets notification of the received notification bulletin from the BB application. The companion application daemon performs external processing upon request, as described further below. Therefore, the companion application daemon is informed of the received notification, even though at this stage of the notification processing, it is not necessary for the companion application daemon to take action.

In the operation at the box 1208, the BB application determines which accessory application gets the notification for processing. The BB application may determine the application using an Accessory Application Identifier (App ID) for an application at the accessory device. The App ID is contained in a data field of the notification, and is retrieved by the BB application. That is, the BB application is configured to recognize the App ID data in the notification, as well as other data, as described further below. The BB application may have its own daemon for ID determination processing of this kind. Thus, the App ID determines the accessory application for which the notification is intended. The App ID is stored in the companion device by the BB application, for delivery to other processing components of the companion device and accessory device, as requested. For example, the accessory device utilizes the App ID to determine if the application for which the notification is intended is a third-party application with a custom user interface display, or is a system application with a predetermined user interface configuration. A system application may comprise, for example, a mail application or text messaging application. A third-party application may comprise, for example, an application associated with an online auction service or with a social messaging platform. The App ID of the notification has the same ID value for all notifications intended for the same accessory application, and therefore is easily recognized by the companion device, and is passed to the accessory device.

At the box 1210, a forwarding application on the accessory device is provided with the notification ID of the notification and the accessory application identifier. This identifying data is received by the forwarding application of the accessory device from the BB application of the companion device. The forwarding application, also referred to herein as a carousel application, can be an application that manages a home screen, launches applications, and/or manages other services. The forwarding application determines a notification display application, executing on the accessory device, in accordance with the determined accessory application identifier, such that the determined notification display application is configured to process notifications intended for any one of a plurality of accessory applications. The notification display application is referred to herein as a bulletin factory application. The carousel application forwards the notification information to the bulletin factory application that it has determined is appropriate for notification handling. The determined bulletin factory application determines user interface and display properties for generating a display of the received notification at the accessory device, in accordance with a single indicated accessory application of the plurality of accessory applications. Thus, the carousel application determines the appropriate bulletin factory application for further processing of the notification and provides that application with the notification information. In some implementations, the forwarding application can be similar to the "Springboard" application in the "iOS" operating system available from Apple Inc. of Cupertino, Calif., USA. Another example of an application that may perform operations such as those of the forwarding application may include an application such as the "Launchpad" application that is available with the "Macintosh" operating system from Apple Inc. of Cupertino, Calif., USA. The operation processes continues with the operations illustrated in FIG. 12B.

At the box 1222, in FIG. 12B, the bulletin factory application loads a notification interface for display of custom notification features for the received notification. The notification interface specifies interface data, in accordance with the unique identification data and context data of the notification, that specifies the appearance of the notification when displayed on the accessory device. Some of the interface data may be external to the accessory device and will need to be retrieved, and therefore the companion application provides the retrieved interface data to the accessory device for processing by the determined bulletin factory application.

Thus, the operation of processing a received notification at the companion device eventually results in the bulletin factory application of the accessory device generating a notification interface preference list that is used by the bulletin factory application to initiate communication with the appropriate corresponding accessory device application (also referred to as the accessory device "stub" application above) and the corresponding accessory device application daemon. The accessory device application daemon communicates with the bulletin factory application regarding the notification ID.

To be able to contact the companion device to get all the specific information that for display of the notification, the companion application daemon will communicate with the companion application extension, which examines the context data to retrieve any information needed from external sources for display of the notification at the accessory device. The retrieved information may then be provided to the accessory device application, which then communicates with the bulletin factory application. In this way, the accessory device application can provide templates for the notification display at the accessory device, which can then be used to generate the desired notification display with the bulletin factory application.

In the operation of the box 1224, the accessory application determines user interface and display properties for generating a display of the notification at the accessory device. The accessory application provides the determined user interface and display properties to the accessory application daemon.

At the box 1226, the accessory application daemon requests content from the companion application daemon, in accordance with the notification ID and context data. The context data may comprise a relatively large amount of data, and therefore the companion application typically does not provide the entire details of the context data to the accessory device, which would involve a lengthy network communication. Instead, the companion application provides a reduced amount of the context data that is sufficient for the accessory device to determine the extent of external information it needs to display the notification. For example, the request for content including reduced context data may be determined by the accessory application in accordance with a notification interface preference list (p-list) stored in the accessory device for each application, as described further below.

More particularly, the notification may require external components such as images or display legends or the like that will be retrieved from an external source, such as a Web site or a third party application developer. The accessory device has insufficient resources to obtain such external data on its own, but instead it will request such external components from the companion device. Thus, the companion application is configured to provide the accessory device with a reduced amount of information from the context data, an amount that is sufficient for the accessory device to determine whether it will request external components from the companion device. Thus, the accessory application can use the reduced amount of context data it receives to request the needed data from the companion application daemon. The companion application is configured to recognize, from the accessory device request, where to obtain the external components.

At the box 1228, in response to the request from the accessory application for the content needed for display of the notification, the companion application has obtained the requested external components and sends the requested external data components to the accessory application daemon. It may be necessary for the companion application to obtain the requested content from network sources, such as data stored at network storage locations or Web sites. Alternatively, the requested external components might be stored at the companion device itself. The companion application, being installed at the companion device, has sufficient resources at its disposal to obtain such content from network sources and/or its own local storage.

In the box 1230, the accessory application daemon provides the content to the accessory application for generating display of the notification at the accessory device. In this way, the obtained content may be combined with the user interface and display properties by the accessory application to properly provide the notification display at the accessory device. More particularly, the bulletin factory application can determine a display template comprising a base notification interface by reading data from a notification preference list stored at the accessory device. The bulletin factory communicates with the accessory application daemon, which in turn contacts the companion device application daemon to obtain any needed content or external display components, based on the notification ID and context data. When the bulletin factory application has received content and/or any external display components, it combines the content and/or external display components with the notification display template, and generates the notification display for the accessory device.

A. Categories

The received notification (see box 1204 of FIG. 12A) may include at least one category. That is, the notification that is sent to the determined bulletin factory application may be such that the determined bulletin factory application generates the display of the received notification at the accessory device in accordance with the category, as well as the retrieved interface data and the determined user interface and display properties. Data relating to the optional categories is stored in the context data of the notification, as part of a "categories" data field. Thus, a notification can have a "category" to provide a parameter to specify multiple notification interfaces for a single accessory application. In this way, multiple notification interfaces (displays) may be accommodated by the notification categories. For example, in the case of a social messaging accessory application, there might be multiple types of notifications, such as "liking" a post, or requesting to "friend" another user. Each of these types of notifications can require a different interface, though both are related to the same accessory application. The category option provides a means of designating different custom user interfaces for the same accessory application. In this way, the social messaging accessory application could include a notification interface category for "liking" a post and could include a different notification interface category for a "friend" request.

The multiple categories can be implemented in one embodiment with, for example, different interface preference lists for display properties, for each different category that is a possibility in the notification. Thus, the notification interface preference list may include an entry called "categories" in which the interface category may be specified. The implementation of the category feature may be made easier by providing at least one category named "default" in the category data field, to accommodate the case where an accessory application does not have multiple categories. More particularly, the category information may be provided by the companion application to an accessory device application daemon, which provides the category to the determined bulletin factory application.

B. Custom URL

A notification has the capability of launching an accessory application and activating a desired operation in the application or initiating operation to a predetermined location of the application. For example, a notification may launch an accessory application for social messaging and solicit a "friend" designation for a user identified in the notification, or may request a "like" response to a URL page identified in the notification. Such specific operations of an application are alternatives to a more general notification display, in which a more general specification of a display template may be implemented with a notification interface preference list, in conjunction with notification data. For example, a notification interface preference list for an accessory application may specify an arrangement of display buttons and images, with display legends or titles provided by information in the notification data. The notification interface preference list for an accessory application is typically installed with the installation of the application itself at the accessory device.

With respect to processing a notification to launch an application and proceed to a predetermined application location, the operation described herein utilizes a custom URL (uniform resource locator) that specifies a URL associated with the accessory application and specifies a parameter that can be utilized by an application or online processing associated with the application. For example, a custom URL may include a reference to a third party social messaging application or an online auction application, and may also include a parameter that can be consumed by the third party application to perform an application function such as soliciting a "friend" designation for a user identified in the notification, or requesting a "like" response to a URL page identified in the notification.

An example of the custom URL format could include a "com" identifier to indicate a custom URL will follow, and then the format might include an identifier of the accessory application name, followed by an input parameter that will be recognized by the accessory application and can support communication with the third party application in accordance with the input parameter. For example, a custom URL may be in the format of "com.app_name://input_parameter". The "app_name" is the name of the accessory application, typically in terms of an online domain name associated with the accessory application. The "input_parameter" is the input parameter that will be recognized by the accessory application to support communication with the third party application in accordance with the input parameter.

If the custom URL processing feature is desired for an accessory application, the preference list for that accessory application will include data that the accessory device operating system will recognize as indicating an ability to process the custom URL. The preference list for an accessory application is installed at the time the accessory application itself is installed on the device. The accessory application will be configured to correctly process the data contained in the custom URL so as to launch the accessory application and proceed to the desired predetermined operation or accessory application location. Thus, as described above in this section, the disclosed configuration can provide a customized data payload to the companion extension on launch, after selecting a notification.

C. Operation within Companion Device and Accessory Device

Figure 13:
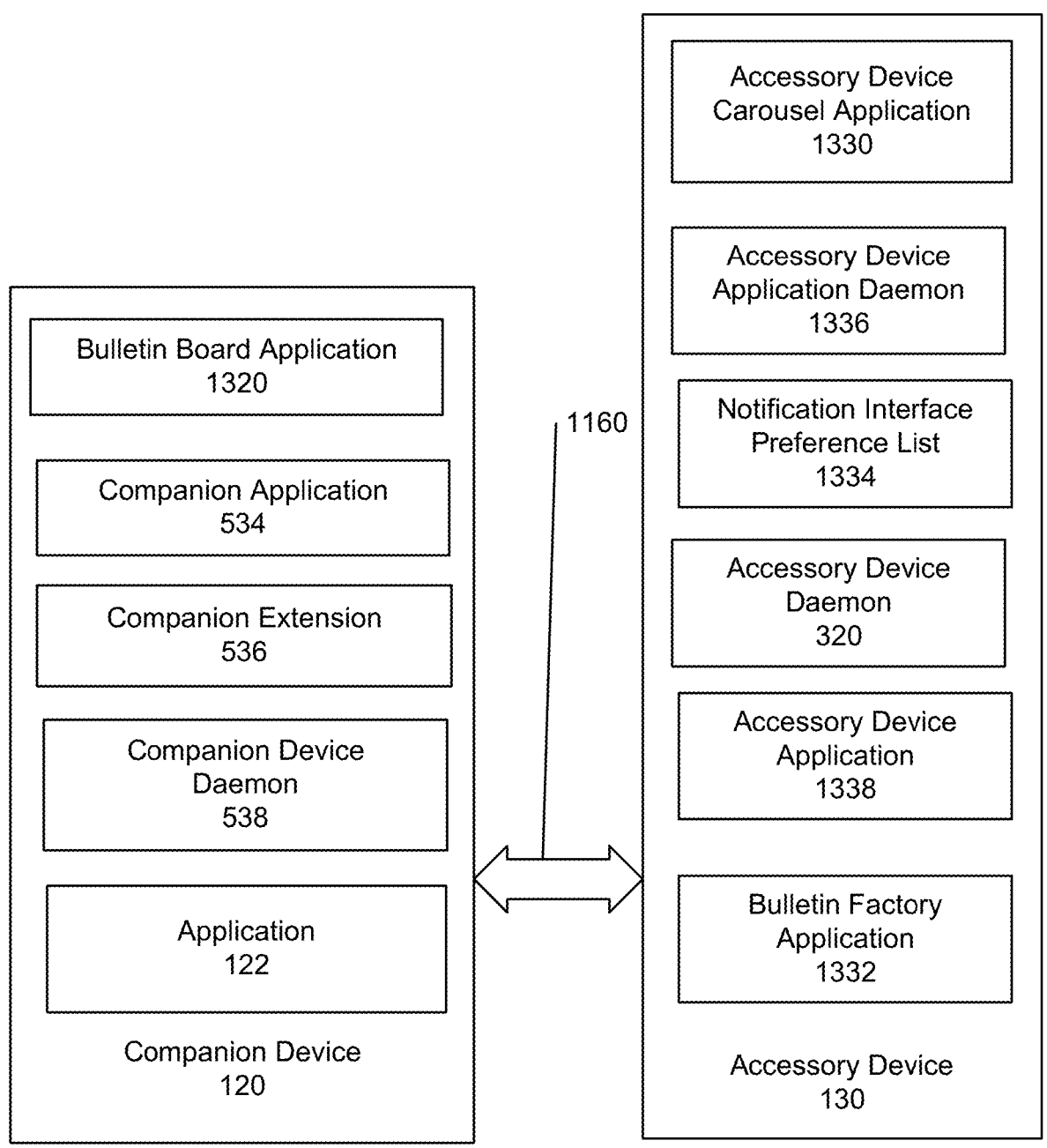
FIG. 13 is a block diagram that illustrates the devices that perform the operations illustrated in FIG. 12A and FIG. 12B.

FIG. 13 shows a block diagram that illustrates the devices that perform the operations illustrated in FIG. 12A and FIG. 12B. In FIG. 13, drawing reference numerals for like components have like numerals, with respect to the drawing figures described above.

FIG. 13 illustrates the companion device 120 includes the Bulletin Board application 1320 described above that receives notifications for processing. The Bulletin Board application receives notifications and, as described above, directs the received notification to the appropriate accessory application of the accessory device 130. The other illustrated components of the companion device 120 correspond to the components described above, as noted, such as the companion device application 534, companion extension 536, companion device daemon 538, and companion device application 122.

FIG. 13 also illustrates the accessory device 130 with its carousel application 1330 that, as noted above, determines the appropriate bulletin factory application 1332, which is configured to process notifications intended for any one of a plurality of accessory device applications. FIG. 13 also shows the notification interface preference list 1334, which is used to ensure proper combining of display elements and templates for display of the notification, and also shows the accessory device application daemon 1336, which communicates with the bulletin factory application 1332. The double-headed arrows 1160 in FIG. 13 indicate network connections for communication between the companion device 120 and the accessory device 130. The connections may comprise a wired network connection, or a wireless connection, or a combination of the two types of connection.

Figure 14:
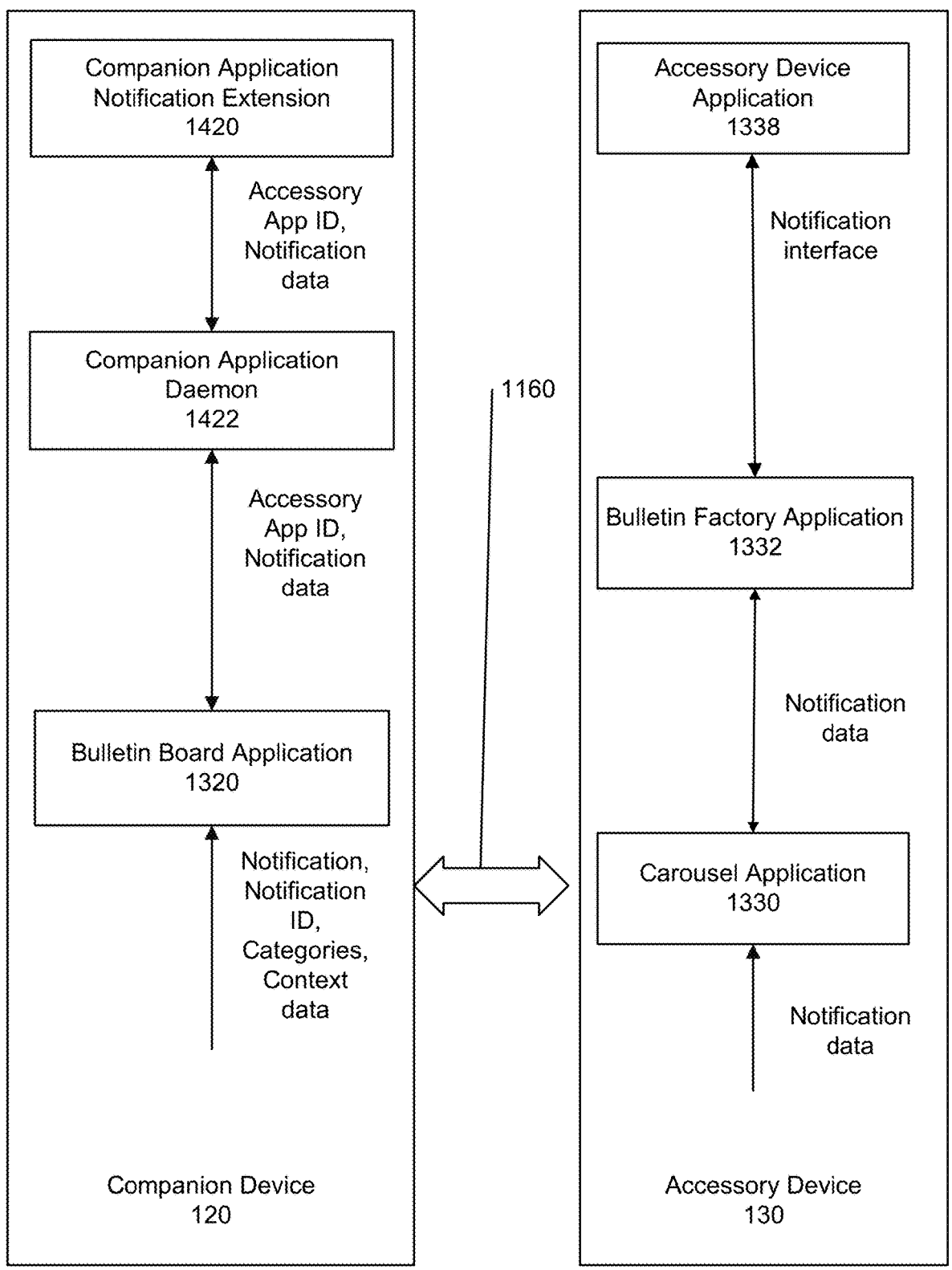
FIG. 14 is a block diagram that illustrates the devices that perform the operations illustrated in FIG. 12A and FIG. 12B.

FIG. 14 is a block diagram that illustrates the devices that perform the operations illustrated in FIG. 12A and FIG. 12B. The bulletin board application 1320 of the companion device 120 receives all incoming notifications. The bulletin board application provides the accessory application ID and notification data (including the notification ID) to the companion application daemon 1422, after determining the application ID and appropriate notification data as described above. The notification data may include context data, which is stored in memory of the companion device and is used in directing the distribution and handling of the notification. A companion device application notification extension 1420 receives the information from the companion application daemon 1422 and processes the notification for handling, in cooperation with the accessory device 130, as described above.

At the accessory device 130, the carousel application 1330 receives notification data from the companion device over the network connection 1160. The carousel application determines the proper bulletin factory application for handling the notification, in conjunction with the notification interface preference list 1334 (FIG. 13), and provides notification data to the determined bulletin factory application. The bulletin factory application provides notification information, including the notification interface display information, to the accessory device application 1338 for further processing. The bulletin factory application may be implemented as a component of, or subset to, the accessory device application. The accessory device application 1338 generates the display information for showing the notification at the accessory device display.

Figure 15:
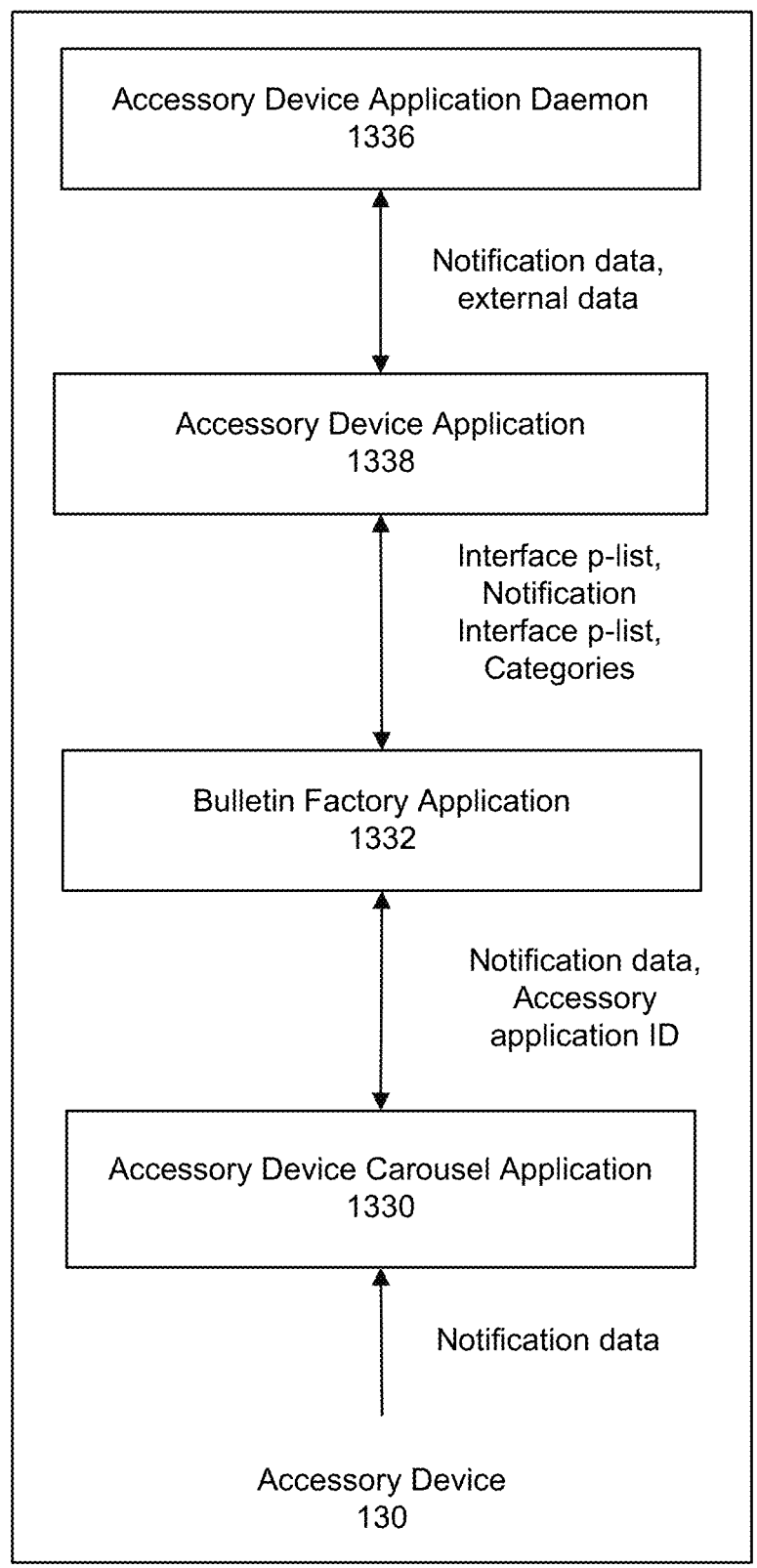
FIG. 15 is a block diagram that illustrates the processing of the accessory device illustrated in FIG. 14.

FIG. 15 is a block diagram that illustrates details of the processing of the accessory device 130 illustrated in FIG. 14. The carousel application 1330 receives notification data from the companion device, as noted above. The carousel application determines the appropriate bulletin factory application 1332 to receive the notification data, based on the accessory application ID of the notification. For example, the accessory device will typically have a mail bulletin factory associated with processing notifications for the Mail application. Similarly, most accessory devices will include an SMS application for processing text messaging, and the accessory device will include an SMS bulletin factory associated with processing notifications for the SMS application.

The bulletin factory application 1332 provides the interface preference list (p-list) to the accessory device application 1338 for identification of processing options, such as custom URL processing, as described above. The bulletin factory application also provides the notification interface p-list to the accessory device application for a template from which the notification display at the accessory device can be prepared, as described above. The category and context information can also be passed from the bulletin factory application to the accessory device application.

The accessory device application daemon 1336 manages communications between the accessory device application 1338 and the various components of the companion device. For example, the application daemon 1336 may utilize the notification data as described above in determining external data that should be requested from the companion device for display of the notification. The application daemon 1336 also can pass the received external data from the companion device to the accessory device application for further processing.

VII. Computer Device Configurations

Figure 16:
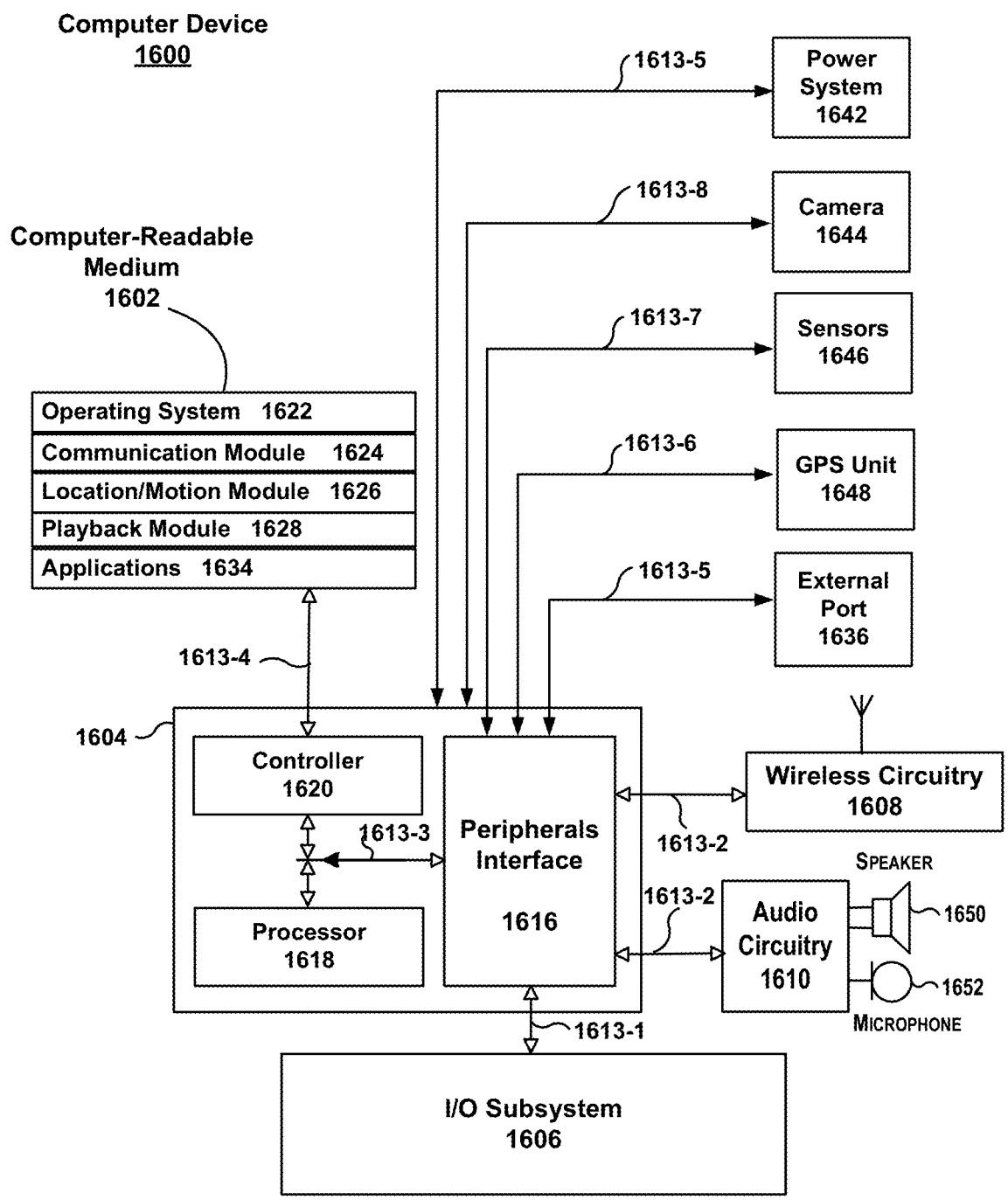
FIG. 16 is a block diagram of a computer device according to an embodiment of the invention.

FIG. 16 is a block diagram of a computer device 1600 according to an embodiment of the invention. The computer device 1600 may comprise any of the devices illustrated in FIG. 1, although those skilled in the art will understand that some components of the device 1600 may not be included, depending on the nature of the device. For example, if the computer device is a desktop computer or accessory device, it might not include the GPS unit, as movement is not likely in the case of a desktop computer, and the limited repertoire of resources on an accessory device would not likely include a GPS unit.

The computer device 1600 generally includes a computer-readable medium 1602, a processing system 1604, an Input/Output (I/O) subsystem 1606, wireless circuitry 1608, and audio circuitry 1610 including a speaker 1650 and a microphone 1652. These components may be coupled by one or more communication buses or signal lines 1613. The device 1600 can be any electronic computer device, including a wearable computer device, a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. As examples, a wearable device can comprise a wrist worn device, a device that is clipped or pinned to the user's clothing, a device with a lanyard or chain that is wearable around the user's neck, a headband device, eyeglasses, or any other device that can be secured to the user's person or clothing.

It should be apparent that the architecture shown in FIG. 16 is only one example of an architecture for the computer device 1600, and that the device 1600 can have more or fewer components than shown, or a different configuration of components. The various components shown in FIG. 16 can be implemented in hardware, software, or a combination of both hardware and software, including one or more signal processing and/or application specific integrated circuits.

Wireless circuitry 1608 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some embodiments, the wireless circuitry 1608 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A computer device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

The wireless circuitry 1608 is coupled to the processing system 1604 via a peripherals interface 1616. The peripherals interface 1616 can include conventional components for establishing and maintaining communication between peripherals and the processing system 1604. Voice and data information received by the wireless circuitry 1608 (e.g., in speech recognition or voice command applications) is sent to one or more processors 1618 via the peripherals interface 1616. One or more processors 1618 are configurable to process various data formats for one or more application programs 1634 stored on the medium 1602.

The peripherals interface 1616 couples the input and output peripherals of the device to a processor 1618 and the computer-readable medium 1602. One or more processors 1618 communicate with the computer-readable medium 1602 via a controller 1620. The computer-readable medium 1602 can be any device or medium that can store code and/or data for use by one or more processors 1618. The medium 1602 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact discs) and DVDs (digital video discs). In some embodiments, the peripherals interface 1616, one or more processors 1618, and the memory controller 1620 can be implemented on a single chip, such as processing system 1604. In some other embodiments, they can be implemented on separate chips.

The computer device 1600 also includes a power system 1642 for powering the various hardware components. The power system 1642 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, the computer device 1600 includes a camera 1644. In some embodiments, the computer device 1600 includes sensors 1646. The sensors can include accelerometers, compass, gyrometer, pressure sensors, audio sensors, light sensors, barometers, and the like. The sensors 1646 can be used to sense location aspects, such as auditory or light signatures of a location.

In some embodiments, the computer device 1600 can include a GPS receiver, sometimes referred to as a GPS unit 1648. A computer device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the device. Based on these estimations, the device can determine a location fix, altitude, and/or current speed. A location fix can be geographical coordinates such as latitudinal and longitudinal information.

One or more processors 1618 run various software components stored in the medium 1602 to perform various functions for the device 1600. In some embodiments, the software components include an operating system 1622, a communication module (or set of instructions) 1624, a location module (or set of instructions) 1626, a playback app 1628, and other applications (or sets of instructions) 1634, such as a navigation app.

The operating system 1622 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

The communication module 1624 facilitates communication with other devices over one or more external ports 1636 or via the wireless circuitry 1608 and includes various software components for handling data received from the wireless circuitry 1608 and/or external port 1636. The external port 1636 (e.g., USB, FireWire, Lightning connector, 30-pin connector, etc.) is adapted for coupling directly to other devices or indirectly over a network (e.g., the Internet, wireless LAN, etc.).

The one or more applications 1634 on the computer device 1600 can include any applications installed on the device, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), and the like. The one or more applications 1634 can also include a specific app for controlling playback of content items, updating the content item database, or any other suitable application.

There may be other modules or sets of instructions (not shown), such as a graphics module, a time module, and the like. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1606 can include a display system such as coupling to an external display, or can include an integrated display such as a flat panel display, or touch-sensitive display. The display of the I/O subsystem 1606 displays visual output to the user in a GUI format. The visual output can include text, graphics, video, and any combination thereof. Some or all of the visual output can correspond to user-interface objects. The display can use LED (light emitting diode), LCD (liquid crystal display) technology, or LPD (light emitting polymer display) technology, although other display technologies can be used in other embodiments.

In some embodiments, the I/O subsystem 1606 can include a display and user input devices such as a keyboard, mouse, and/or trackpad. In some embodiments, the I/O subsystem 1606 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the medium 1602) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, the computer device 1600 can include a touchpad for activating or deactivating particular functions. In some embodiments, the touchpad is a touch-sensitive area of the device that, unlike the touch screen, does not display visual output. The touchpad can be a touch-sensitive surface that is separate from the touch-sensitive display or can be an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method of operating an accessory device that is in communication with a companion device over a network connection, the method comprising:
   receiving, by the accessory device from the companion device, an interface definition, wherein the interface definition comprises a display specification defining a display of data on the accessory device;
   installing the interface definition received from the companion device on the accessory device;
   detecting a display change to be displayed at a display of the accessory device;
   generating a display message at the accessory device for an application that is installed at the accessory device and that is identified by an application identifier, in response to the detected display change;
   sending the generated display message with the application identifier from an accessory device daemon to a companion device daemon over the network connection, in response to the detected display change;
   receiving an updated display message from the companion device daemon at the accessory device daemon;
   determining one or more display values from the updated display message for the application identified by the application identifier, wherein the one or more display values are in accordance with the interface definition that defines a display of one or more elements on the accessory device; and
   displaying the one or more display values at the display of the accessory device in accordance with the interface definition for the accessory device.

2. The method of claim 1, wherein the application identifier corresponds to an identifier of an application at the companion device that can process the display message.

3. The method of claim 1, wherein the application identifier is utilized by the companion device daemon for directing communication of the display message to a corresponding companion device extension that can process the display message.

4. The method of claim 1, wherein detecting the display change comprises detecting a user interaction with the display of the accessory device.

5. The method of claim 1, wherein detecting the display change comprises detecting a system notification for display at the display of the accessory device.

6. The method of claim 1, wherein generating the display message is performed in accordance with display parameters specified by a stored framework and the interface definition.

7. The method of claim 1, further comprising:
producing the updated display message with output of a companion application that receives the generated display message and that is installed at the companion device, in accordance with a framework stored at the companion device and accessed by the companion application.

8. The method of claim 1, further comprising sending a confirmation message from the accessory device to the companion device upon installation of an accessory device application and the interface definition at the accessory device.

9. The method of claim 1, wherein the accessory device is a wearable computer device.

10. The method of claim 1, further comprising:
sending an accessory device application package from the companion device to the accessory device, the accessory device application package including programming code that, when executed by the accessory device, provides an accessory device application and the interface definition.

11. The method of claim 1, wherein the companion device is a mobile device and the accessory device is a wearable device.

12. The method of claim 1, wherein the accessory device and the companion device are a same type of device.

13. The method of claim 1, wherein the one or more elements are artifacts, and wherein an artifact includes one of a display button, a window, a text box, a background, and wallpaper.

14. The method of claim 1, wherein the interface definition comprises device framework data for the accessory device.

15. A method of operating a companion device that is in communication with an accessory device over a network connection, the method comprising:
sending, by the companion device to the accessory device, an interface definition, wherein the interface definition comprises a display specification defining a display of data on the accessory device;
receiving a generated display message over the network connection at a companion device daemon from an accessory device daemon installed at the accessory device, the generated display message identifying a display change to be displayed at a display of the accessory device for an application that is installed at the accessory device and that is identified by an application identifier;
producing an updated display message with output of a companion application that receives the generated display message and that is installed at the companion device, in accordance with a framework stored at the companion device and accessed by the companion application, wherein the display message comprises one or more display values in accordance with the interface definition that defines a display of one or more elements on the accessory device; and
sending the generated updated display message from the companion device daemon to the accessory device daemon over the network connection.

16. The method of claim 15, wherein the application identifier corresponds to an identifier of an application at the companion device that can process the generated display message.

17. The method of claim 15, wherein the application identifier is utilized by the companion device daemon for directing communication of the display message to a corresponding companion device extension that can process the display message.

18. The method of claim 15, wherein the identified display change is identified in response to detecting a user interaction with the display of the accessory device.

19. The method of claim 15, wherein the identified display change is identified in response to detecting a system notification for display at the display of the accessory device.

20. The method of claim 15, wherein the generated display message is generated in accordance with display parameters specified by a stored framework and the interface definition.

21. The method of claim 15, further comprising:
producing the updated display message with the output of the companion application that receives the generated display message and that is installed at the companion device, in accordance with the framework stored at the companion device and accessed by the companion application.

22. The method of claim 15, further comprising sending a confirmation message from the accessory device to the companion device upon installation of an accessory device application and the interface definition at the accessory device.

23. The method of claim 15, wherein the accessory device is a wearable computer device.

24. The method of claim 15, further comprising:
sending an accessory device application package from the companion device to the accessory device, the accessory device application package including programming code that, when executed by the accessory device, provides an accessory device application and the interface definition.

25. The method of claim 15, wherein the display message includes an accessory device application identifier that is utilized by the companion device daemon for directing communication of the display message to a corresponding companion device application.

26. The method of claim 15, further comprising:
receiving an update display message from the accessory device, the update display message comprising a change to display values of the display of the accessory device in accordance with a user interaction or system notification at the accessory device, the update display message including an accessory device application identifier;
generating updated display values for display at the display of the accessory device, the updated display values comprising display values updated from the display values of the display message by the companion application and/or a companion extension at the companion device; and
sending the update display message that includes the updated display values and the accessory device application identifier to the accessory device for display.

27. The method of claim 15, further comprising:
receiving at the companion device a companion device application package comprising
a companion device application for execution in support of an accessory device application file,
a companion device extension that determines a companion device application and the framework stored at the companion device to be utilized in support of the accessory device application file, and
an accessory device application package; and
installing the companion device application at the companion device.

28. The method of claim 27, wherein the companion device extension includes programming code that, when executed by the companion device, determines display values for display at the accessory device.

29. The method of claim 28, wherein the companion device extension determines the display values in accordance with framework data.

30. The method of claim 27, wherein the companion device application further includes the companion device daemon for communication between the companion device application and an accessory device application.

31. The method of claim 15, wherein the accessory device is a wearable computer device.

32. A computer product comprising a non-transitory computer readable medium storing a plurality of instructions for controlling a computer system to perform an operation comprising:
sending, by a companion device to an accessory device, an interface definition, wherein the interface definition comprises a display specification defining a display of data on the accessory device;
receiving a generated display message over a network connection at a companion device daemon from an accessory device daemon installed at the accessory device, the generated display message identifying a display change to be displayed at a display of the accessory device for an application that is installed at the accessory device and that is identified by an application identifier;
producing an updated display message with output of a companion application that receives the generated display message and that is installed at the companion device, in accordance with a framework stored at the companion device and accessed by the companion application, wherein the display message comprises one or more display values in accordance with the interface definition that defines a display of one or more elements on the accessory device; and
sending the generated updated display message from the companion device daemon to the accessory device daemon over the network connection.

33. A device comprising:
a memory;
at least one network interface; and
a processor coupled to the memory and the at least one network interface, wherein the processor performs a method comprising:
sending, by a companion device to an accessory device, an interface definition, wherein the interface definition comprises a display specification defining a display of data on the accessory device;
receiving a generated display message over a network connection at a companion device daemon from an accessory device daemon installed at the accessory device, the generated display message identifying a display change to be displayed at a display of the accessory device for an application that is installed at the accessory device and that is identified by an application identifier;
producing an updated display message with output of a companion application that receives the generated display message and that is installed at the companion device, in accordance with a framework stored at the companion device and accessed by the companion application, wherein the display message comprises one or more display values in accordance with the interface definition that defines a display of one or more elements on the accessory device; and
sending the generated updated display message from the companion device daemon to the accessory device daemon over the network connection.

34. The device of claim 33, wherein the processor performed method further comprises:
receiving at the companion device a companion device application package comprising
a companion device application for execution in support of an accessory device application file,
a companion device extension that determines a companion device application and framework stored at the companion device to be utilized in support of the accessory device application file, and
an accessory device application package; and
installing the companion device application at the companion device.

35. An accessory device comprising:
a memory;
at least one network interface; and
a processor coupled to the memory and the at least one network interface, wherein the processor performs a method comprising:
receiving, by the accessory device from a companion device, an interface definition, wherein the interface definition comprises a display specification defining a display of data on the accessory device;
installing the interface definition on the accessory device;
detecting a display change to be displayed at a display of the accessory device;
generating a display message at the accessory device for an application that is installed at the accessory device and that is identified by an application identifier, in response to the detected display change;
sending the generated display message with the application identifier from an accessory device daemon to a companion device daemon over a network connection, in response to the detected display change;
receiving an updated display message from the companion device daemon at the accessory device daemon;
determining one or more display values from the updated display message for an application identified by the application identifier, wherein the one or more display values are in accordance with the interface definition that defines a display of one or more elements on the accessory device; and
displaying the one or more display values at the display of the accessory device in accordance with the interface definition for the accessory device.

36. A computer product comprising a non-transitory computer readable medium storing a plurality of instructions for controlling a computer system to perform an operation comprising:

receiving, by an accessory device from a companion device, an interface definition, wherein the interface definition comprises a display specification defining a display of data on the accessory device;

installing the interface definition on the accessory device;

detecting a display change to be displayed at a display of the accessory device;

generating a display message at the accessory device for an application that is installed at the accessory device and that is identified by an application identifier, in response to the detected display change;

sending the generated display message with the application identifier from an accessory device daemon to a companion device daemon over a network connection, in response to the detected display change;

receiving an updated display message from the companion device daemon at the accessory device daemon;

determining one or more display values from the updated display message for an application identified by the application identifier, wherein the one or more display values are in accordance with the interface definition that defines a display of one or more elements on the accessory device; and displaying the one or more display values at the display of the accessory device in accordance with the interface definition for the accessory device.

* * * * *